United States Patent
Meadows et al.

(10) Patent No.: US 12,045,705 B2
(45) Date of Patent: Jul. 23, 2024

(54) DYNAMIC AND INTUITIVE AGGREGATION OF A TRAINING DATASET

(71) Applicant: Artificial Intelligence Foundation, Inc., Las Vegas, NV (US)

(72) Inventors: Robert Marc Meadows, Las Vegas, NV (US); Lars Ulrich Buttler, Menlo Park, CA (US); Alan Peter Swearengen, San Francisco, CA (US)

(73) Assignee: Artificial Intelligence Foundation, Inc., Las Vegas, NV (US)

( * ) Notice: Subject to any disclaimer, the term of this patent is extended or adjusted under 35 U.S.C. 154(b) by 1800 days.

(21) Appl. No.: 15/984,390

(22) Filed: May 20, 2018

(65) Prior Publication Data

US 2019/0122146 A1    Apr. 25, 2019

(51) Int. Cl.
*G06N 3/006* (2023.01)
*G06F 11/00* (2006.01)
(Continued)

(52) U.S. Cl.
CPC .......... *G06N 3/006* (2013.01); *G06F 11/008* (2013.01); *G06F 11/3024* (2013.01);
(Continued)

(58) Field of Classification Search
CPC ........ G06N 3/006; G06N 20/00; G06N 3/004; G06N 3/008; G06N 3/02; G06N 3/0454; G06N 3/08; G06N 3/0445; G06F 11/008; G06F 11/3024; G06F 11/3409; G06F 11/3447; G06F 11/3452; G06F 2201/815; G06T 11/001; G06T 17/20

See application file for complete search history.

(56) References Cited

U.S. PATENT DOCUMENTS 10,504,268 B1 * 12/2019 Huang ................ G06V 10/772
2015/0084950 A1 * 3/2015 Li ........................... G06T 7/251
345/419

OTHER PUBLICATIONS

Pham, Hai X., Yuting Wang, and Vladimir Pavlovic. "Generative adversarial talking head: Bringing portraits to life with a weakly supervised neural network. "arXivpreprintarXiv:1803.07716 (Year: 2018).*

(Continued)

*Primary Examiner* — Michael J Huntley
*Assistant Examiner* — Adam C Standke
(74) *Attorney, Agent, or Firm* — Steven Stupp

(57) ABSTRACT

A system receives information associated with an interaction with an individual in a context. Then, the system analyzes the information to extract features associated with one or more attributes of the individual. Moreover, the system generates, based at least in part on the extracted features, a group of behavioral agents in a multi-layer hierarchy that automatically mimics the one or more attributes. Next, the system calculates one or more performance metrics associated with the group of behavioral agents and the one or more attributes. Furthermore, the system determines, based at least in part on the one or more performance metrics, one or more deficiencies in the extracted features. Additionally, the system selectively acquires second information associated with additional interaction with the individual in the context based at least in part on the one or more deficiencies to at least in part correct for the one or more deficiencies.

20 Claims, 20 Drawing Sheets

(51) Int. Cl.
    *G06F 11/30*     (2006.01)
    *G06F 11/34*     (2006.01)
    *G06N 3/004*     (2023.01)
    *G06N 3/008*     (2023.01)
    *G06N 3/02*     (2006.01)
    *G06N 3/044*     (2023.01)
    *G06N 3/045*     (2023.01)
    *G06N 3/08*     (2023.01)
    *G06N 20/00*     (2019.01)
    *G06T 11/00*     (2006.01)
    *G06T 13/40*     (2011.01)
    *G06T 17/20*     (2006.01)

(52) U.S. Cl.
    CPC ...... *G06F 11/3409* (2013.01); *G06F 11/3447* (2013.01); *G06F 11/3452* (2013.01); *G06N 3/004* (2013.01); *G06N 3/008* (2013.01); *G06N 3/02* (2013.01); *G06N 3/045* (2023.01); *G06N 3/08* (2013.01); *G06N 20/00* (2019.01); *G06T 11/001* (2013.01); *G06T 13/40* (2013.01); *G06F 2201/815* (2013.01); *G06N 3/044* (2023.01); *G06T 17/20* (2013.01)

(56) References Cited

OTHER PUBLICATIONS

Olszewski, Kyle, et al. "Realistic dynamic facial textures from a single image using gans."Proceedings of the IEEE International Conference on Computer Vision. (Year: 2017).*
Provoke Definition—Dictionary.com.*

\* cited by examiner

DYNAMIC AND INTUITIVE AGGREGATION OF A TRAINING DATASET

CROSS-REFERENCE TO RELATED APPLICATION

This application is related to U.S. patent application Ser. No. 15/984,386, entitled "Automated Dynamic Virtual Representation of Individual Attributes," by Brent Matthew Haines et al., filed on May 20, 2018, and to U.S. patent application Ser. No. 15/984,392, entitled "Multi-Dimensional Puppet with Photorealistic Movement," by Brent Matthew Haines et al., filed on May 20, 2018, the contents of both of which are hereby incorporated by reference.

FIELD

The described embodiments relate to a technique for dynamically and intuitively aggregating a training dataset for a dynamic virtual representation of an individual that mimics one or more attributes of the individual.

BACKGROUND

Advances in machine learning are providing new and unique opportunities for computers to aid humans by performing or automating tasks. For example, a computer may be used to develop a predictive model. In supervised learning, a predictive model is developed through training. Training typically involves establishing and adapting a learning model (such as one or more neural networks, linear regression systems, logistic regression systems, Bayesian analysis systems, etc.) based on observations, such as examples of human behaviors, e.g., recognizing faces, identifying images, understanding language, performing routine decisions, etc. Therefore, in order to perform the training, human action(s) usually need to be well known, and the results of the action(s) need to be appropriately labeled or classified, so that the parameters in the predictive model can be determined. Moreover, training typically requires that a large number of examples or instances of the observations be measured or assembled.

While the process of developing and training a predictive model is often clear, collecting the large amount of data that is typically used in the training and implementing the resulting predictive model is often complicated, time-consuming and expensive. Notably, the data collection process is usually labor intensive, and the data is often manually processed and inserted into computer system flows. For example, a large amount of manual effort is usually needed to characterize human actions or behaviors to enable machine learning and to capture sufficient observations that the resulting predictive model provides good results. Moreover, once a strong predictive model is obtained, a computer system may need to be refactored or redesigned to effectively use the predictive model.

Even after a predictive model is trained and implemented on a computer system, quality control often remains a concern. Notably, there are a variety of machine-learning techniques with different capabilities and suitability for different tasks. Moreover, the machine-learning techniques usually have small variations in structure and computational parameters that typically need to be tuned and tested against a growing training dataset. Sometimes, feedback is used to optimize a predictive model. For example, a user may need a way to assert when a decision from a predictive model is incorrect or suboptimal. These instances may be recorded and used in an enhanced training dataset. Alternatively or additionally, based on the incorrect or suboptimal decisions, a different machine-learning technique, structure or set of parameters may be used to obtain a predictive model that provides better results. Consequently, a computer system that uses a trained predictive model typically needs to support user feedback, continued assembly of improved training datasets, and/or predictive-model improvement. However, these capabilities also increase the complexity and cost of implementing a robust and a reliable trained predictive model on a computer system.

SUMMARY

A first group of described embodiments relates to a computer system that selectively performs a remedial action. This computer system includes a computation device and a memory that stores program instructions. During operation, the computer system configures a group of behavioral agents in a multi-layer hierarchy, where a given behavioral agent receives one or more inputs and provides an output corresponding to one or more features associated with an individual, and where the inputs to at least some of the behavioral agents include outputs from one or more of the other behavioral agents. Then, the computer system generates, based at least in part on a subset of the outputs, a dynamic virtual representation of one or more attributes of the individual using the group of behavioral agents, where the dynamic virtual representation automatically mimics one or more attributes of the individual in a context. Moreover, the computer system provides information corresponding to the dynamic virtual representation that is intended for an electronic device, and the computer system receives input stimuli associated with the electronic device and that indicate a reaction of a user to the dynamic virtual representation. Next, the computer system selectively performs the remedial action associated with the group of behavioral agents based at least in part on a portion of the input stimuli.

Note that the computation device may include one or more of: a processor, one or more cores in a second processor, or another type of device that performs computation (such as a graphics processing unit or GPU).

In some embodiments, the context includes interacting with the user.

Moreover, the one or more attributes may include one or more of: a behavior, an emotion, a type of humor, a mannerism, a style of speech, a memory or a thought process.

Furthermore, a given behavioral agent may include an artificial neural network.

Additionally, the input stimuli may correspond to one or more of: spoken or written communication with the user, an emotion of the user, or non-verbal communication by the user. In some embodiments, the portion of the input stimuli includes non-verbal communication by the user and/or indicates a type of reaction of the user.

Moreover, the remedial action may include: requesting human guidance based at least in part on the dynamic virtual representation of the one or more attributes of the individual and the portion of the input stimuli; and receiving the human guidance. Furthermore, the remedial action may include: determining revised outputs based at least in part on the group of behavioral agents, the input stimuli and/or the human guidance; generating, based at least in part on a subset of the revised outputs, a revised dynamic virtual representation of the one or more attributes of the individual;

and providing second information corresponding to the revised dynamic virtual representation that is intended for the electronic device.

Additionally, the remedial action may include performing reinforced learning on one or more of the behavioral agents based at least in part on the portion of the input stimuli.

Note that the dynamic virtual representation, with at least some of the aforementioned operations, may be used in a variety of applications, including: personal media (e.g., the individual may be a celebrity and the dynamic virtual representation may be used to communicate with one of their fans or the individual may be a family member and the dynamic virtual representation may be used to communicate with another member of their family), entertainment, gaming, gambling, dating, expert advice, personal recommendations, education, professional consultation, sales, coaching, customer service, tourism, a personalized robot, a personalized electronic device (such as an automobile), leadership, management and/or politics. In some embodiments, the dynamic virtual representation, with at least some of the aforementioned operations, is used provide virtualized human longevity for an individual that is unavailable or that is deceased.

While the preceding embodiments discussed interaction between the dynamic virtual representation and the user, in other embodiments the dynamic virtual representation may interact with another the dynamic virtual representation.

Another embodiment provides the electronic device, which performs one or more operations that are counterparts to at least some of the operations performed by the computer system.

Another embodiment provides a computer-readable storage medium for use in conjunction with a computer system. This computer-readable storage medium includes the program instructions for at least some of the operations performed by the computer system.

Another embodiment provides a method for selectively performing the remedial action. The method includes at least some of the aforementioned operations performed by the computer system.

A second group of described embodiments relates to a computer system that dynamically and intuitively aggregates a training dataset. This computer system includes a computation device and a memory that stores program instructions. During operation, the computer system receives information associated with an interaction with an individual in a context. Then, the computer system analyzes the information to extract features associated with one or more attributes of the individual. Moreover, the computer system uses the extracted features to generate (or train) a dynamic virtual representation using a group of behavioral agents in a multi-layer hierarchy that automatically mimics the one or more attributes of the individual, where a given behavioral agent receives one or more inputs and provides an output corresponding to one or more of the extracted features, and where the inputs to at least some of the behavioral agents include outputs from one or more of the other behavioral agents. Note that the given behavioral agent may include an artificial neural network.

Next, the computer system calculates one or more performance metrics associated with the dynamic virtual representation and the one or more attributes. Furthermore, based at least in part on the one or more performance metrics, the computer system determines one or more deficiencies in the extracted features. Additionally, the computer system selectively acquires second information associated with additional interaction with the individual in the context based at least in part on the one or more deficiencies, where the second information at least in part corrects for the one or more deficiencies, and where acquiring the second information involves provoking specific responses from the individual based at least in part on the one or more deficiencies.

In some embodiments, using the second information, the computer system optionally repeats the analyzing, the extracting of the features, the generating, the calculating, and the determining to generate a revised dynamic virtual representation that have one or more performance metrics that are improved.

For example, the computation device may include one or more of: a processor, one or more cores in a second processor, or another type of device that performs computation (such as a GPU).

Moreover, the information may include: one or more images, sound, writing, an anatomic response, a user-selection from a human interface, neuronal signals, and/or another type of measurement. Furthermore, the context may include interacting with the individual (such as a conversation or a dialog). In some embodiments, the information is associated with an electronic device, e.g., the information may be received from the electronic device. Alternatively, in some embodiments the receiving involves accessing the information in a computer-readable memory.

Additionally, the features may include one or more of: spoken or written communication of the individual, an emotion of the individual, non-verbal communication by the individual, a tone, a style or manner of speaking, a gesture, facial expression, a vital sign, body language, a walking style or gait, folded arms or a posture, an eyebrow position or motion, a sudden motion, a rate or frequency of blinking, a twitch, a gaze direction and/or emotional prosody. In some embodiments, the one or more attributes includes one or more of: a behavior, an emotion, a type of humor, a mannerism, a style of speech, a memory or a thought process (such as a way of thinking or a making a decision).

Note that at least a portion of some of the aforementioned operations of the computer system is performed by a discriminator in a generative adversarial network.

Another embodiment provides the electronic device, which performs one or more operations that are counterparts to at least some of the operations performed by the computer system.

Another embodiment provides a computer-readable storage medium for use in conjunction with a computer system. This computer-readable storage medium includes the program instructions for at least some of the operations performed by the computer system.

Another embodiment provides a method for dynamically and intuitively aggregating the training dataset. The method includes at least some of the aforementioned operations performed by the computer system.

A third group of described embodiments relates to a computer system that provides a dynamic multi-dimensional puppet. This computer system includes a computation device and a memory that stores program instructions. During operation, the computer system provides, based at least in part on predetermined parameters, configuration information, and a group of behavioral agents, a dynamic virtual representation that includes a multi-dimensional puppet having one or more attributes of an individual, where the dynamic virtual representation is configured to automatically mimic one or more attributes of the individual in a context. Moreover, the providing of the dynamic virtual representation that includes the multi-dimensional puppet involves rendering of the multi-dimensional puppet, and the multi-dimensional puppet includes stereopsis information, and has photorealistic movement corresponding to movement behaviors of the individual. Then, the computer system receives an input corresponding to user spatial manipulation of or interaction with the multi-dimensional puppet. Next, the computer system provides, based at least in part on the predetermined parameters, the configuration information, the group of behavioral agents, and the input, the dynamic virtual representation that includes a revised multi-dimensional puppet having the one or more attributes.

For example, the input may be received from an electronic device, which is being used by the user. Moreover, the dynamic virtual representation and/or the revised dynamic virtual representation may be displayed on the electronic device or on a display associated with the electronic device.

Note that the group of behavioral agents may be configured in a multi-layer hierarchy based at least in part on the configuration information. Moreover, a given behavioral agent may receive one or more inputs and may provide an output corresponding to one or more features associated with an individual, and the inputs to at least some of the behavioral agents may include outputs from one or more of the other behavioral agents.

Furthermore, the providing of the dynamic virtual representation that includes the revised multi-dimensional puppet may involve rendering of the revised multi-dimensional puppet, and the revised multi-dimensional puppet may include prehension corresponding to the input.

Additionally, the photorealistic movement may be indistinguishable, to a human, from the movement behaviors or mannerisms of the individual.

In some embodiments, the multi-dimensional puppet may include photorealistic facial and mouth movement while saying phrases.

Moreover, the input may correspond to: haptic interaction, a gaze direction, a verbal command, and/or a gesture.

Furthermore, the rendering may be based at least in part on one or more of: characterization of movement a neck, a mouth and eyes of the individual, phonemes associated with speech of the individual, and/or deformations of a face of the individual while performing the movement behaviors.

Additionally, the multi-dimensional puppet may include 2D data transposed onto a 3D mesh.

In some embodiments, the multi-dimensional puppet may include: a 3D rig having a shape corresponding to at least a shape of a head and neck of the individual; a neutral layer corresponding to a look and color of at least the face and the neck of the individual; a core region overlay layer with 2D bitmaps for portions of the face and the neck of the individual; and/or a specular overlay layer that reproduces specular highlights of the individual. Note that the portions of the face and the neck may include: a mouth, eyes, a submandibular triangle, a submental triangle, and/or a muscular triangle.

Moreover, the multi-dimensional puppet may include looped persistent movements corresponding to the movement behaviors.

Another embodiment provides the electronic device.

Another embodiment provides a computer-readable storage medium for use in conjunction with a computer system. This computer-readable storage medium includes the program instructions for at least some of the operations performed by the computer system.

Another embodiment provides a method for providing the dynamic multi-dimensional puppet. The method includes at least some of the aforementioned operations performed by the computer system.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

The included drawings are for illustrative purposes and serve only to provide examples of possible structures and arrangements for the disclosed systems and techniques. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Figure 1:
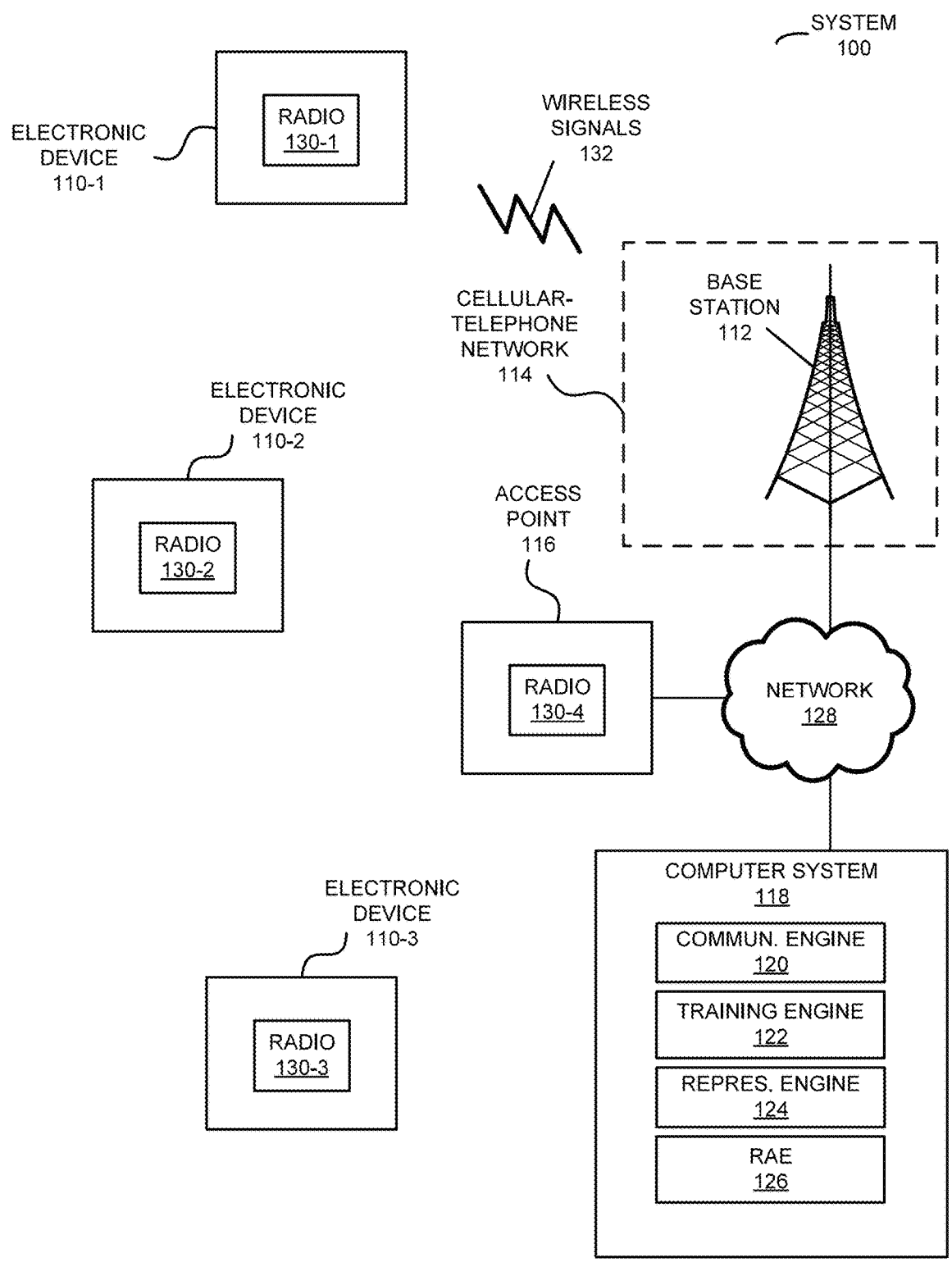
FIG. 1 is a block diagram illustrating a computer system that provides a dynamic virtual representation in accordance with an embodiment of the present disclosure.

Table 1 provides training data during adversarial data generation in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

In a first group of embodiments, a computer system that selectively performs a remedial action is described. During operation, the computer system configures a group of behavioral agents in a multi-layer hierarchy, where a given behavioral agent receives one or more inputs and provides an output corresponding to one or more features associated with an individual, and where the inputs to at least some of the behavioral agents include outputs from one or more of the other behavioral agents. Then, the computer system generates, based at least in part on a subset of the outputs, a dynamic virtual representation of one or more attributes of the individual using the group of behavioral agents, where the dynamic virtual representation automatically mimics one or more attributes of the individual in a context. Moreover, the computer system provides information corresponding to the dynamic virtual representation that is intended for an electronic device, and the computer system receives input stimuli associated with the electronic device and that indicate a reaction of a user to the dynamic virtual representation. Next, the computer system selectively performs the remedial action associated with the group of behavioral agents based at least in part on a portion of the input stimuli.

By selectively performing the remedial action, this interaction technique may modify or update at least some of the behavioral agents. For example, the input stimuli may include or may directly or indirectly indicate a reaction of the user and/or a type of reaction of the user, such as a particular emotion or, e.g., a negative response. Therefore, the interaction technique may dynamically perform reinforcement learning based at least in part on interactions with the user. In this way, the interaction technique may, over time, allow the group of behavior agents to provide an automated and dynamic virtual representation that accurately mimics the one or more attributes of the individual in a variety of contexts, such as different interactions with different users. The resulting group of behavioral agents may facilitate a variety of unique applications or services based at least in part on this accurate dynamic virtual representation of at least aspects of the individual. Consequently, the interaction technique may provide an improved user experience and improved customer satisfaction for the user(s) and the individual.

In a second group of embodiments, a computer system receives information associated with an interaction with an individual in a context. Then, the computer system analyzes the information to extract features associated with one or more attributes of the individual. Moreover, the computer system generates, based at least in part on the extracted features, a dynamic virtual representation using a group of behavioral agents in a multi-layer hierarchy that automatically mimics the one or more attributes. Next, the computer system calculates one or more performance metrics associated with the dynamic virtual representation and the one or more attributes. Furthermore, the computer system determines, based at least in part on the one or more performance metrics, one or more deficiencies in the extracted features. Additionally, the computer system selectively acquires second information associated with additional interaction with the individual in the context based at least in part on the one or more deficiencies to at least in part correct for the one or more deficiencies.

By dynamically and intuitively aggregating the information (and the extracted features), this interaction technique may automatically bootstrap an annotated training dataset that can be used to generate an accurate dynamic virtual representation of the one or more attributes of the individual. Therefore, the interaction technique may simplify and reduce the cost of creating the annotated training dataset. In addition, the resulting process in the interaction technique may be less cumbersome and annoying for the individual. Consequently, the interaction technique may improve the accuracy of the annotated training dataset, and thus the accuracy or the performance of the group of behavioral agents. These capabilities may improve the user experience and the satisfaction of the user(s) and the individual.

In a third group of embodiments, a computer system provides, based at least in part on predetermined parameters, configuration information, and a group of behavioral agents, a dynamic virtual representation that includes a multi-dimensional puppet having one or more attributes of an individual, where the dynamic virtual representation automatically mimics one or more attributes of the individual in a context, the providing of the dynamic virtual representation that includes the multi-dimensional puppet involves rendering of the multi-dimensional puppet, and the multi-dimensional puppet includes stereopsis information, and has photorealistic movement corresponding to movement behaviors of the individual. Then, the computer system receives an input corresponding to user spatial manipulation of or interaction with the multi-dimensional puppet. Next, the computer system provides, based at least in part on the predetermined parameters, the configuration information, the group of behavioral agents, and the input, the dynamic virtual representation that includes a revised multi-dimensional puppet having the one or more attributes.

By providing the dynamic virtual representation that includes the multi-dimensional puppet, the interaction technique may more-realistically mimic the one or more attributes of the individual. Consequently, the interaction technique may improve the user experience and the satisfaction of user(s) of the computer system and the individual.

In the discussion that follows, an individual or a user may be a person. However, in other embodiments, the individual may be replaced by an animal that is living or that once lived. Moreover, in some embodiments, the individual is replaced by a fictitious person or animal, such as an aggregate person or animal that is based at least in part on attributes or characteristics of many different people or animals, such as a mean or an average of the attributes or characteristics. In some embodiments, the interaction technique is used by a type of organization instead of a user, such as a business (which should be understood to include a for-profit corporation, a non-profit corporation or another type of business entity), a group (or a cohort) of individuals, a sole proprietorship, a government agency, a partnership, etc.

Moreover, in the discussion that follows, electronic devices and/or components in the computer system may communicate using a wide variety of communication protocols. For example, the communication may involve wired or wireless communication. Consequently, the communication protocols may include: an Institute of Electrical and Electronics Engineers (IEEE) 802.11 standard (which is sometimes referred to as 'Wi-Fi®,' from the Wi-Fi Alliance of Austin, Texas), Bluetooth® (from the Bluetooth Special Interest Group of Kirkland, Washington), another type of wireless interface (such as another wireless-local-area-network interface), a cellular-telephone communication protocol (e.g., a 3G/4G/5G communication protocol, such as UMTS, LTE), an IEEE 802.3 standard (which is sometimes referred to as 'Ethernet'), etc. In the discussion that follows, Ethernet and Wi-Fi are used as illustrative examples.

Communication among electronic devices is shown in FIG. 1, which presents a block diagram illustrating a system 100 that provides a dynamic virtual representation (which is sometimes referred to as a 'MindTwin' or an 'AI Twin'). Notably, system 100 includes: one or more electronic devices 110 (such as one or more computers and/or one or more portable electronic devices, e.g., one or more cellular telephones), optional base station 112 in cellular-telephone network 114, optional access point 116 (such as a physical access point or a virtual access point that is implemented using software), and/or a computer system 118 (such as a computer or a server), which are sometimes collectively referred to as 'components' in system 100. Moreover, computer system 118 may include: communication engine 120 (or module), training engine 122 (or module), representation engine 124 (or module), and/or remedial action engine (RAE) 126 (or module).

Note that components in system 100 may communicate with each other via a network 128, such as the Internet, a cellular-telephone network (such as cellular-telephone network 114) and/or a wireless local area network (WLAN). Thus, the communication may involve wired and/or wireless communication. In embodiments where the communication involves wireless communication, the wireless communication includes: transmitting advertising frames on wireless channels, detecting another component in system 100 by scanning wireless channels, establishing connections (for example, by transmitting association requests), and/or transmitting and receiving packets.

As described further below with reference to FIG. 19, the one or more electronic devices 110, the optional base station 112, the optional access point 116 and/or computer system 118 may include subsystems, such as a networking subsystem, a memory subsystem and a processor subsystem. In addition, the one or more electronic devices 110, the optional base station 112, the optional access point 116 and/or computer system 118 may include radios 130 in the networking subsystems. More generally, the components can include (or can be included within) any electronic devices with the networking subsystems that enable these components to communicate with each other. Note that wireless communication can comprise transmitting advertisements on wireless channels to enable a pair of components to make initial contact or detect each other, followed by exchanging subsequent data/management frames (such as association requests and responses) to establish a connection, configure security options (e.g., Internet Protocol Security), transmit and receive packets or frames via the connection, etc.

Moreover, as can be seen in FIG. 1, wireless signals 132 (represented by a jagged line) are transmitted by radios 130 in the components. For example, radio 130-1 in electronic device 110-1 may transmit information (such as packets) using wireless signals. These wireless signals may be received by radios 130 in one or more of the other components, such as by optional base station 112 or optional access point 116. This may allow electronic device 110-1 to communicate information to optional base station 112 or optional access point 116, and thus, to computer system 118.

In the described embodiments, processing a packet or frame in a component may include: receiving the wireless signals with the packet or frame; decoding/extracting the packet or frame from the received wireless signals to acquire the packet or frame; and processing the packet or frame to determine information contained in the packet or frame.

Note that the communication between at least any two of the components in system 100 may be characterized by one or more of a variety of performance metrics, such as: a received signal strength indication (RSSI), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

As described previously, it can be complicated, time-consuming and expensive to collect and annotate training datasets for a predictive model, and it can be difficult to implement the resulting predictive model to ensure quality control. In order to address these problems, the interaction technique may be used dynamically and intuitively aggregate a training dataset for the predictive model, and to selectively update the training dataset and adapt the predictive model in an integrated manner (such as based at least in part on further interactions).

Notably, a user (who may be the individual) may use electronic device 110-1 to interactively provide, via network 128 and communication engine 120, information to training engine 122. This information may, directly or indirectly, specify multiple features associated with the individual. In some embodiments, the information includes: one or more images of the individual, user selections (such as text), writing provided by the user, spoken word(s) or sounds made by the user, measurements of or associated with the user, metadata associated with the features, etc. Note that the features may be extracted from the information (e.g., using an image-processing technique, an acoustic-processing technique and/or a natural-language processing technique) by electronic device 110-1 and/or computer system 118. As described further below with reference to FIGS. 6-16, training engine 122 may use these features to develop, determine or generate a group of behavioral agents (which are described further below with reference to FIGS. 4 and 5), such as one or more artificial neural networks and/or one or more machine-learning models (such as a supervised-learning model).

For example, the user may provide the information by dynamically interacting with training engine 122 in an intuitive manner. These interactions may allow the user to seamlessly provide the information, without requiring a separate and cumbersome annotation operation. In some embodiments, the interaction occurs by having the user converse with or interact with displayed or provided content on electronic device 110-1 (such as a game or a questionnaire), which is provided, directly or indirectly, by training engine 122. Notably, the content may include a user interface associated with a software application that is resident on and that executes on electronic device 110-1. Alternatively, the user may interact with a web page that is provided by training engine 122, and which is rendered by a web browser on electronic device 110-1. Note that at least a portion of the software application executing on electronic device 110-1 may be an application tool that is embedded in the web page, and that executes in a virtual environment of the web browser. Thus, the application tool may be provided to electronic device 110-1 via a client-server architecture. Moreover, the software application operated by the user may be a standalone application or a portion of another application that is resident on and that executes on electronic device 110-1 (such as a software application that is provided by electronic device 110-1 or that is installed on and that executes on electronic device 110-1).

Moreover, as described further below with reference to FIGS. 2, 3, 17 and 18, using the group of behavioral agents representation engine 124 may interactively provide, via network 128 and communication engine 120, a dynamic virtual representation that automatically (e.g., by a computer or an electronic device, and without real-time intervention or adaptation by a human) mimics one or more attributes of the individual in a context to one or more of electronic devices 110, which in turn may present the dynamic virtual representation of the one or more attributes of the individual to users of one or more of electronic devices 110. For example, the one or more attributes may include: a behavior, an emotion, a type of humor, a mannerism, a style of speech, a memory and/or a thought process. Furthermore, an electronic device (such as electronic device 110-2) may present the dynamic virtual representation using: a display, a headset, e.g., a virtual reality or an augmented reality headset, electronic or digital glasses, one or more speakers, a haptic device, e.g., a haptic glove, a neural interface, and/or another sensory feedback device). Note that a 'context' may include a dynamic interaction (such as a conversation, a dialog and, more generally, a type of interaction in which there is a back-and-forth interaction) with at least one of the users of the one or more electronic devices 110.

During a dynamic interaction with a presented dynamic virtual representation, a user of one of electronic devices 110 (such as electronic device 110-2) may have a reaction to the dynamic virtual representation. This reaction may include verbal communication (such as a spoken word, a phrase with two or more words, or a sound, e.g., a sigh), haptic feedback (such as motion of one or more digits or an extremity, contact or near contact with a touch-sensing device), writing (such as a word, a phrase or a sentence), a user-selection of a physical button or a virtual icon displayed on a touch-sensitive display (e.g., using a keyboard, a mouse, a touchpad, a pen, a pointer, or a human-interface device), a drawing (such as a happy or a sad face), an anatomic response (such as pulse, respiration, a systolic blood pressure, a diastolic blood pressure, a pulse pressure, at least a local skin temperature, at least a local skin color, pupil size, etc.) and/or non-verbal communication or cues (such as body language, e.g., folded arms or a posture, a gesture, a facial expression, an eyebrow position or motion, a sudden motion, e.g., physically recoiling or moving away, a rate or frequency of blinking, a wink, a twitch, a gaze direction, emotional prosody, a tone, a style or manner of speaking, etc.). Note that the reaction may, directly or indirectly, indicate a type of reaction of the user (which is sometimes referred to as a 'response') to the dynamic virtual representation. For example, the type of reaction may include an emotion or an emotional state of the user, of which the user may or may not be consciously aware.

Electronic device 110-2 may include one or more sensors that measure or receive the user's reaction and convert the reaction into an electronic format (which is sometimes referred to as an 'input stimuli'). For example, electronic device 110-2 may include: one or more image sensors (such as a CCD or a CMOS image sensor, which may acquire one or more images in the visible spectrum and/or in another band of frequencies), one or more microphones, a directional microphone (such as an acoustic array), a haptic sensor, a pressure sensor, a contact or a near-contact sensor (such as a capacitive sensor, a touch-sensitive display, etc.), a vital sign sensor, a human-interface device (such as a keyboard, a mouse, a touchpad, a pen, a pointer, etc.), a time-of-flight sensor, a thermal sensor, a set of electrodes (such as electroencephalogram or deep-brain electrodes) and/or another type of sensor. Then, electronic device 110-2 may provide, via network 128 and communication engine 120, the input stimuli to computer system 118.

Next, remedial action engine 126 may selectively perform a remedial action based at least in part on a portion of the received input stimuli. For example, the remedial action may include: requesting human guidance (such as feedback about whether the mimicking of the one or more attributes is correct and/or how to improve or change the mimicking of the one or more attributes) based at least in part on the dynamic virtual representation of the one or more attributes of the individual and the portion of the input stimuli; and receiving the human guidance. Note that the human guidance may be requested from the individual, a representative of the individual or a group of individuals in the event that the type of reaction indicates that there is a need for feedback, such as when the type of reaction indicates the user is displeased or is having a negative response to the dynamic virtual representation. However, in other embodiments, the feedback may be requested when the type of reaction indicates that the user is having a response (positive and/or negative) that is stronger than a threshold value (such as 0.5, 0.7, 0.8, 0.9 or 0.95) or when the type of reaction indicates that there is a probability, greater than a threshold value, that the user is having a particular response. In some embodiments, the feedback is selectively requested based at least in part on a history of previous remedial actions associated with a particular dynamic virtual representation. Moreover, based at least in part on the human guidance and at least a portion of the received input stimuli, remedial action engine 126 may instruct training engine 122 to generate a revised dynamic virtual representation using the group of behavioral agents (which may include revisions to at least some of the behavioral agents and/or at least some of their inter-relationships, such as input/output interconnections among the group of behavioral agents). In this way, the group of behavioral agents may be revised, so that representation engine 124 may interactively provide, via network 128 and communication engine 120, the revised dynamic virtual representation that automatically mimics the one or more attributes of the individual in the context to one or more of electronic devices 110, which in turn may present the revised dynamic virtual representation of the one or more attributes of the individual to the users of one or more of electronic devices 110.

Alternatively or additionally, remedial action engine 126 may instruct training engine 122 to generate the revised dynamic virtual representation based at least in part on at least a portion of the input stimuli without requesting and receiving the human guidance. Thus, in these embodiments, remedial action engine 126 may automatically perform reinforced learning on one or more of the behavioral agents. Consequently, the interaction technique may allow closed-loop adaptation of the behavioral agents based at least in part on intuitive and integrated interaction between the dynamic virtual representation and one or more of the users, as opposed to trying to rely on a cumbersome and potentially annoying separate feedback process. Note that the adaptation based at least in part on the seamless feedback embodied in the input stimuli may be performed: continuously, periodically or as needed (such as depending on the type of interaction and/or an assessment of the performance, e.g., the accuracy, of the dynamic virtual representation automatic mimicking of the one or more attributes of the individual). In these ways, the accuracy of the dynamic virtual representation (relative to the actual one or more attributes of the individual) may be improved, so that, over time, the accuracy is improved to better than 80, 90, 95 or 99%.

Although we describe the network environment shown in FIG. 1 as an example, in alternative embodiments, different numbers or types of electronic devices may be present. For example, some embodiments comprise more or fewer components. As another example, in another embodiment, different components are transmitting and/or receiving packets or frames.

Figure 2:
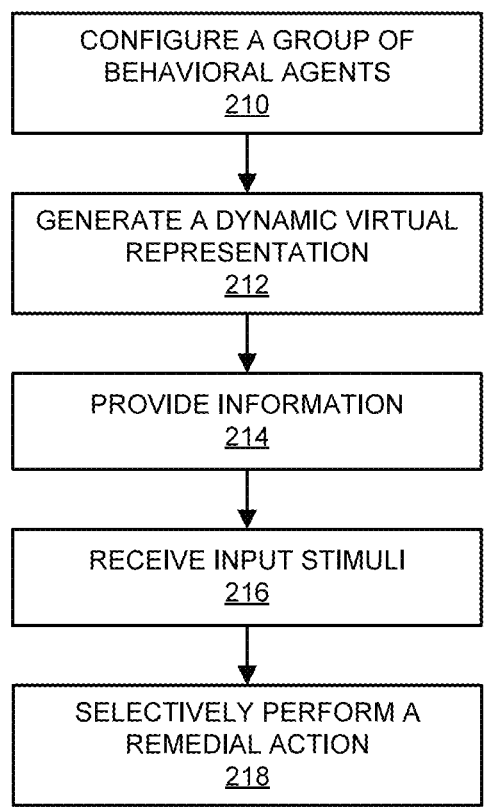
FIG. 2 is a flow diagram illustrating a method for selectively performing a remedial action in accordance with an embodiment of the present disclosure.

FIG. 2 presents embodiments of a flow diagram illustrating method 200 for selectively performing a remedial action, which may be performed by a computer system (such as computer system 118 in FIG. 1). Notably, the computer system may include a computation device that performs method 200. For example, the computation device may include one or more of: a processor, one or more cores in a second processor, or another type of device that performs computation (such as a GPU).

During operation, the computer system configures a group of behavioral agents (operation 210) in a multi-layer hierarchy, where a given behavioral agent receives one or more inputs and provides an output corresponding to one or more features associated with an individual, and where the inputs to at least some of the behavioral agents include outputs from one or more of the other behavioral agents. Note that the given behavioral agent may include an artificial neural network.

Then, the computer system generates, based at least in part on a subset of the outputs, a dynamic virtual representation (operation 212) of one or more attributes of the individual using the group of behavioral agents, where the dynamic virtual representation automatically mimics one or more attributes of the individual in a context. For example, the one or more attributes may include one or more of: a behavior, an emotion, a type of humor, a mannerism, a style of speech, a memory or a thought process (such as a way of thinking or a making a decision). Note that the context may include interacting with a user, who may be the same or another individual.

Moreover, the computer system provides information (operation 214) corresponding to the dynamic virtual representation that is intended for an electronic device, and the computer system receives input stimuli (operation 216) associated with the electronic device and that indicate a reaction of the user to the dynamic virtual representation. For example, the input stimuli may correspond to one or more of: spoken or written communication with the user, an emotion of the user, or non-verbal communication by the user.

Next, the computer system selectively performs the remedial action (operation 218) associated with the group of behavioral agents based at least in part on a portion of the input stimuli. The portion of the input stimuli may include non-verbal communication by the user and/or may indicate a type of reaction of the user. For example, the type of reaction may include a positive reaction or emotion, or a negative reaction or emotion.

In some embodiments, the remedial action includes: requesting human guidance based at least in part on the dynamic virtual representation of the one or more attributes of the individual and the portion of the input stimuli; and receiving the human guidance. Furthermore, the remedial action may include: determining revised outputs based at least in part on the group of behavioral agents, the input stimuli and/or the human guidance; generating, based at least in part on a subset of the revised outputs, a revised dynamic virtual representation of the one or more attributes of the individual; and providing second information corresponding to the revised dynamic virtual representation that is intended for the electronic device. Additionally, the remedial action may include performing reinforced learning on one or more of the behavioral agents based at least in part on the portion of the input stimuli. This reinforced learning may be performed with or without the human guidance.

In this way, the computer system (for example, software executed in an environment, such as an operating system, of the computer system) may selectively adapt the group of behavioral agents to improve the dynamical virtual representation. Moreover, the interaction technique may allow the dynamical virtual representation to be improved in a seamless and an intuitive manner, which may reduce or eliminate the need for more frequent manual human guidance or feedback (which may, therefore, reduce the use of network bandwidth and computation resources in computer system 100 and network 128). In these ways, the interaction technique may simplify the implementation of the group of behavioral agents while helping to ensure quality control. Consequently, the interaction technique may enhance the user experience and satisfaction of the users of electronic devices 110 and/or the individual.

Figure 3:
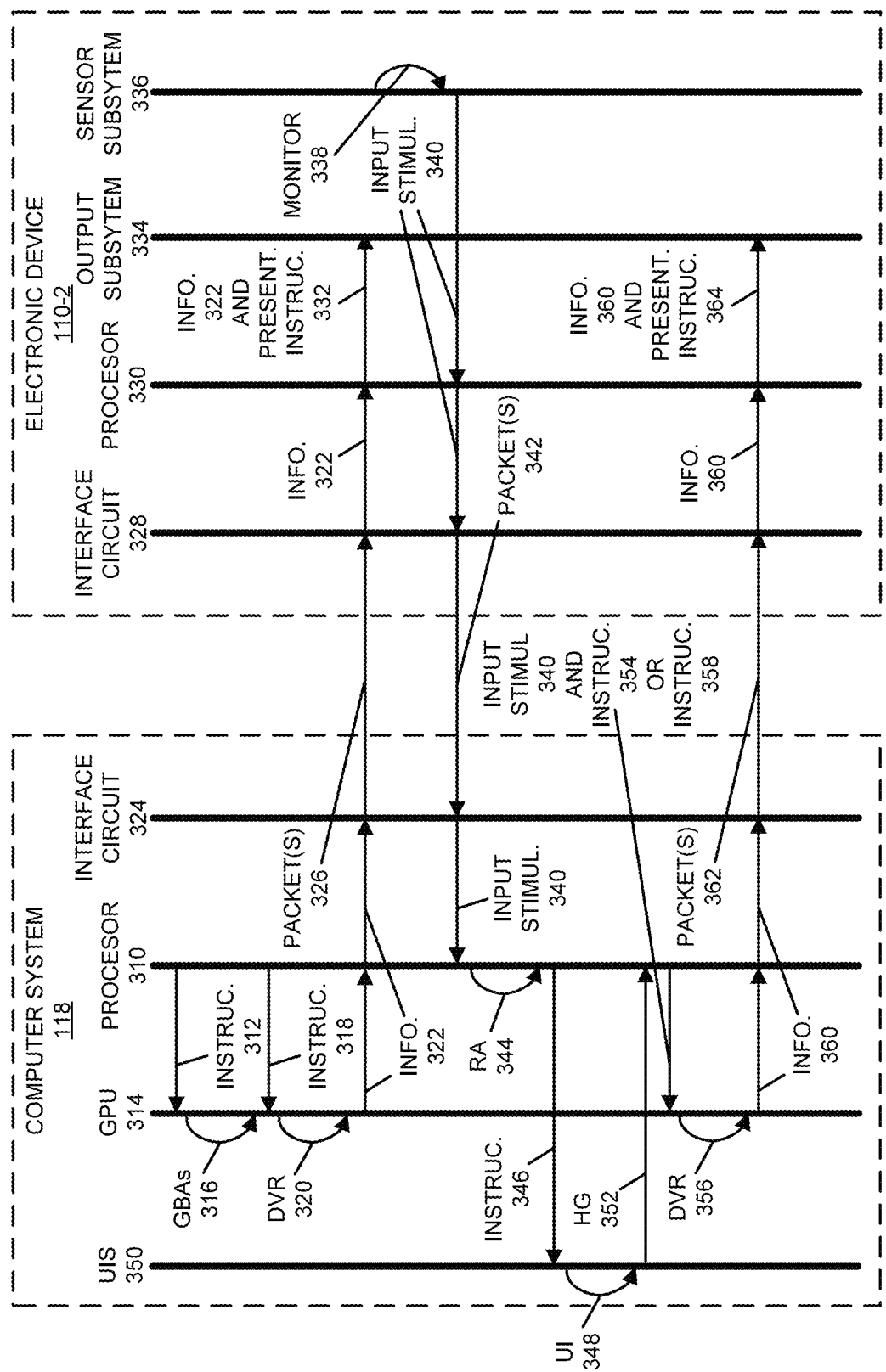
FIG. 3 is a drawing illustrating communication among components in the computer system in FIG. 1 in accordance with an embodiment of the present disclosure.

Embodiments of the interaction technique are further illustrated in FIG. 3, which presents a drawing illustrating communication among components in system 100 (FIG. 1). Notably, during the interaction technique, processor 310 executing program instructions may instruction 312 GPU 314 to configure a group of behavioral agents (GBAs) 316. Then, processor 310 may instruction 318 GPU 314 to generate a dynamic virtual representation (DVR) 320 of one or more attributes of an individual using the group of behavioral agents 316, where the dynamic virtual representation 320 automatically mimics the one or more attributes of the individual in a context.

Moreover, GPU 314 may provide information 322 corresponding to the dynamic virtual representation 320 to processor 310. Next, processor 310 may provide information 322 to interface circuit 324, which provides one or more packets 326 or frames with information 322 to electronic device 110-2.

After receiving the one or more packets 326, interface circuit 328 in electronic device 110-2 may provide information 322 to processor 330 in electronic device 110-2. Then, processor 330 may provide information 322 and presentation instructions 332 to output subsystem 334 (such as a display and one or more speakers) in electronic device 110-2. Moreover, output subsystem 334 may present the dynamic virtual representation 320 to a user of electronic device 110-2. While not shown in FIG. 3, the user of electronic device 110-2 may dynamically interact with the dynamic virtual representation 320 (such as during a conversion), which may involve back-and-forth communication between computer system 100 and electronic device 110-2.

Furthermore, sensor subsystem 336 may monitor 338 a user of electronic device and may provide, to processor 330, one or more input stimuli 340 that indicate a reaction of the user to the dynamic virtual representation 320. Processor 330 may provide input stimuli 340 to interface circuit 328, which may provide one or more packets 342 or frames with input stimuli 340 to computer system 100.

After receiving the one or more packets 342, interface circuit 324 may provide input stimuli 340 to processor 310. Based at least in part on the dynamic virtual representation 320 and a portion of input stimuli 340, processor 310 may selectively perform a remedial action (RA) 344. For example, remedial action 344 may involve processor 310 providing instructions 346 for a user interface (UI) 348 with a request for human guidance to user-interface subsystem 350 (such as a touch-sensitive display) in computer system 100. In response, user-interface subsystem (UIS) 350 may display user interface 348 and may receive human guidance (HG) 352. Based at least in part on human guidance 352, processor 310 may selectively instruct 354 GPU 314 to adapt or modify the group of behavioral agents 316 to generate a revised dynamic virtual representation 356 using, e.g., the dynamic virtual representation 320 and/or at least the portion of input stimuli 340. Alternatively or additionally, processor 310 may selectively and automatically (i.e., without human guidance 352) instruct 358 GPU 314 to adapt or modify the group of behavioral agents 316 to generate the revised dynamic virtual representation 356 using, e.g., the dynamic virtual representation 320 and/or at least the portion of input stimuli 340.

Subsequently, GPU 314 may provide information 360 corresponding to the revised dynamic virtual representation 356 to processor 310. Next, processor 310 may provide information 360 to interface circuit 324, which provides one or more packets 362 or frames with information 360 to electronic device 110-2.

After receiving the one or more packets 362, interface circuit 328 may provide information 360 to processor 330. Processor 330 may provide information 360 and presentation instructions 364 to output subsystem 334, which may present the revised dynamic virtual representation 356 to the user.

While FIG. 3 illustrates unilateral communication between components, in some embodiments one or more of these communication operations involve bilateral communication.

Representative Embodiments

In some embodiments, the interaction technique allows a user to selectively (such as when needed, e.g., when a response or reaction of the user indicates that there is a problem or an inaccuracy) provide feedback about a trained predictive model (such as the dynamic virtual representation), so that an accuracy or correctness of the dynamic virtual representation is improved. For example, the response may include a negative emotional response or a positive emotional response. The goal may be to avoid surprising or startling a user, entertainment (such as spontaneity, a sense of humor, being good at puns), etc.

Moreover, the feedback may be selectively used by the computer system to revise the group of behavioral agents that provide the dynamic virtual representation. In this way, the computer system may continue to develop or aggregate a training dataset that facilitates improved mimicking of the one or more attributes of the individual by the group of behavioral agents, which may allow human interaction to be replaced with interaction with the dynamic virtual representation.

Note that a given behavioral agent may encapsulate work or tasks within the computer system. For example, the given behavioral agent may receive one or more inputs (which may include one or more outputs from one or more of the other behavioral agents) and may provide an output corresponding to one or more features associated with an individual. Moreover, at least an attribute mimicked by at least a subset with one or more of the behavioral agents may include a single decision by or interaction with the user, and the inputs to at least the subset may include the data that is needed in order to fulfill this task. In some embodiments, the given behavioral agent may be monitored, so that the inputs to, the parameters of and/or the outputs from the given behavioral agent may be recorded, which may be used as part of a future training dataset for the group of behavioral agents.

The interaction technique may allow for a group of the behavioral agents to be organized into the multi-level hierarchy that enables the computer system to automatically mimic the one or more attributes of the individual, which may enable the computer system to perform more complicated tasks (such as having a dynamic or interactive dialog or conversation with the user). For example, one or more behavioral agents may categorize mood based at least in part on language, facial expression, audio tone/profile, etc.

While some interactions with humans cannot be automated using the computer system, many of them are suitable. For example, interactions in which there is a correct or optimizable result or answer that can be used a target (such as a conversation, singing, dancing, performing, etc.) may be suitable for such automation. The disclosed embodiments of the interaction technique provide resources for training predictive models that can be converged on a training target. In the process, the interaction technique implemented on the computer system can dynamically change the nature of human interactions or human-machine interactions to take advantage of advances in machine intelligence.

The interaction technique may facilitate or be used in a wide variety of applications. Notably, the interaction technique may enable artificial intelligence (AI) applications such as: communications and personal media, human-AI teamwork and personal AI, artificial immortality and/or personal legacy. For example, a dynamic virtual representation may be trained using diverse inputs (such as audio and video, as well as associated analysis or recognition) that monitor human behavior during routine interaction with or use of software executed by or on behalf of the computer system, and that may be used to provide an unlimited and personal one-on-one conversations with a user that are realistic or human-like conversations. Therefore, the dynamic virtual representation may provide a form of personalized media that is be able to automatically and dynamically replicate or mimic an individual's voice, facial expressions, natural language, and their memories/context. Moreover, the dynamic virtual representation may be able to train and self-diagnose itself and/or another dynamic virtual representation. Consequently, the dynamic virtual representation may be fully generative, and may be a scalable ecosystem that is engaging and viral.

For example, a dynamic virtual representation may be used in applications with one or more users concurrently, such as: personal media (e.g., the individual may be a celebrity and the dynamic virtual representation may be used to communicate with one of their fans or the individual may be a family member and the dynamic virtual representation may be used to communicate with one or more other members of their family), entertainment, gaming, gambling, dating, expert advice, personal recommendations, education, professional consultation (such as with a medical professional or an attorney), sales, coaching, customer service, leisure or tourism, a personalized robot, a personalized electronic device (such as an automobile), leadership, management and/or politics. In some embodiments, the dynamic virtual representation, with at least some of the aforementioned operations, is used provide virtualized human longevity for an individual that is unavailable or that is deceased.

While the preceding embodiments discussed interaction between the dynamic virtual representation and the user, in other embodiments the dynamic virtual representation may interact with another the dynamic virtual representation. Consequently, in some embodiments a dynamic virtual representation may be used to train another dynamic virtual representation.

Moreover, instead of mimicking the one or more attributes of the individual, in some embodiments a dynamic virtual representation may mimic one or more attributes of multiple individuals, such as one or more average or mean attributes of the individuals. Furthermore, the human-AI platform provided by the computer system that implements the interaction technique may also facilitate dynamic interactions between groups of people, such as a celebrity and group of fans, within a family or an organization, within a larger community, between a business and customers, a government and citizens or residents of a community, etc. In general, the interactions may be direct or indirect, such as via third parties or intermediaries.

In some embodiments, a dynamic virtual representation is used to provide an unlimited or timeless legacy for an individual (which is sometimes referred to as an 'Immortal MindTwin'). By talking about themselves while interacting with the computer system, the individual may train the Immortal MindTwin. Subsequently, this dynamic virtual representation may be capable of automated and realistic interactions with the individual's friends, family or fans, when the individual is unavailable, incapacitated or deceased. In this way, the Immortal MindTwin may allow the individual to reliably and faithfully communicate with their great-great-grandchildren.

In other embodiments, a dynamic virtual representation may provide a media revolution in the form of a so-called 'Celebrity MindTwin', which can provide the ultimate celebrity-fan interaction. Such a dynamic virtual representation may be able to communicate with individual fans or groups of fans and may be able to recognize fans and engage them in personal conversations. The Celebrity MindTwin may be able to understand the fan's emotions, remember prior conversations or interactions, as well as important events or details of the celebrity's life, and can share exciting news. This capability may increase engagement with existing fans and may allow new fans to be created.

Note that in some embodiments, AI may be used to provide a decentralized, trusted and personalized reality defender, which automatically detects a dynamic virtual representation or, more generally, computer-generated content. This reality defender may provide tools that allow individuals to protect their lives, prosperity, dignity and humanity. Therefore, the reality defender may help users protect themselves against fake truth. For example, the reality defender, which may be based at least in part on deep learning, may be implemented as a free browser plugin or a software application that can notify users of suspected deception (such as fake media) in real time. Notably, the reality defender may analyze suspected media and may provide warnings or alerts, and/or may filter out identified fake media.

Figure 4:
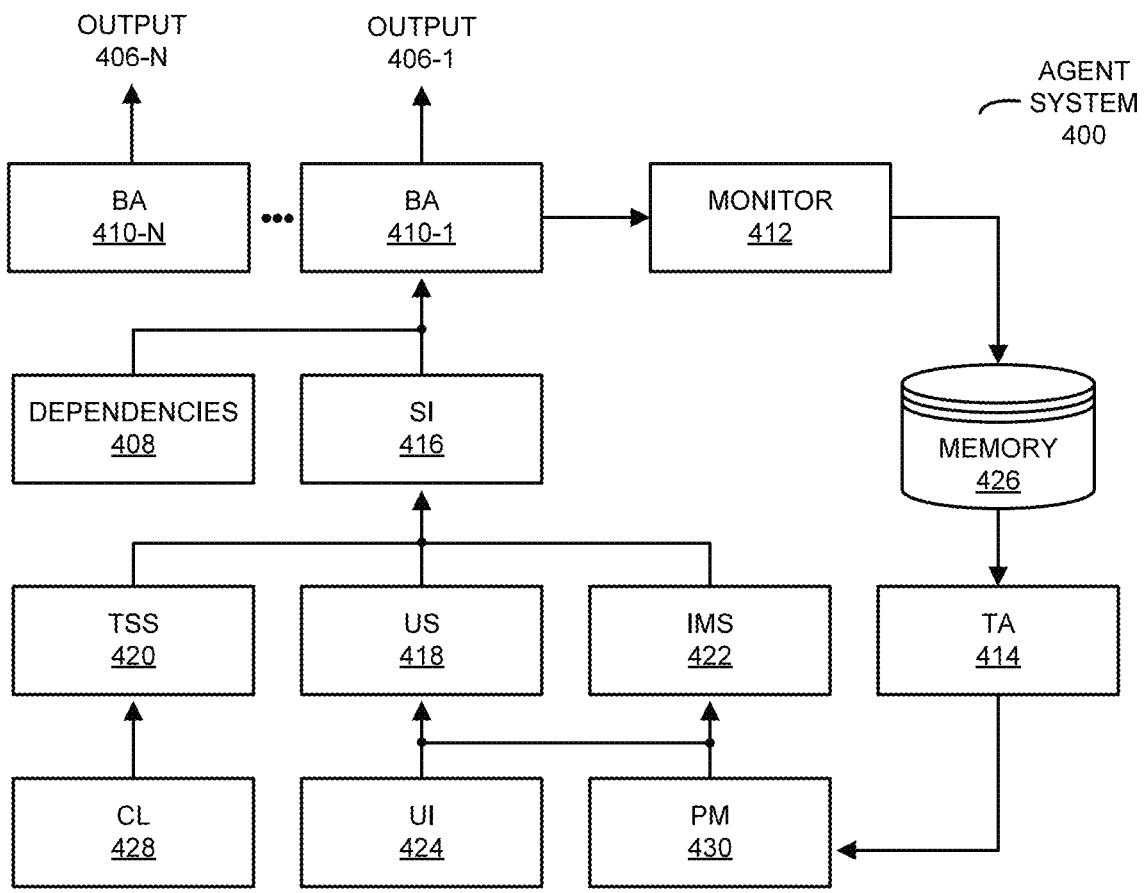
FIG. 4 is a block diagram illustrating an agent system in accordance with an embodiment of the present disclosure.

We now further describe the computer system and the group of behavioral agents. FIG. 4 presents a block diagram illustrating an agent system 400. This agent system may abstract a particular decision or task within the computer system, and may include: behavioral agents 410, monitor 412, and/or training engine (TA) 414. Moreover, a given behavioral agent (such as behavioral agent 410-1) may be so-called 'simple behavioral agents' that are sourced or receive inputs, via source interface (SI) 416, from one or more sources. Alternatively, a given behavioral agent may be 'compound behavioral agents' that includes a collection of other behavioral agents. Note that behavioral agents 410 may be organized and instantiated in a dynamic and ongoing manner in order to match a state of the computer system or a dynamic virtual representation, which may be constantly changing. Behavioral agents 410 provide outputs 406 (such as a person's demeanor, emotional state, how they ask questions, etc.) based at least in part on inputs. In some embodiments, a given behavioral agent receives outputs from one or more other behavioral agents as input(s) via dependencies 408. For example, a dependency or inter-relationship may include how a person is feeling.

As noted previously, action(s) of a given behavioral agent (such as behavioral agent 410-1) may be sourced using different sources. For example, in user sourcing (US) 418 (which may be a default sourcing technique), data in behavioral agent 410-1 may be used to present the parameters that have been supplied and to prompt a user for a response (such as a decision) via a user interface (UI) 424. Moreover, the user-supplied decision(s) and/or output(s) from behavioral agent 410-1 may be recorded by monitor 412 and stored in a data structure in memory 426. For example, memory 426 may store: a timestamp, a stream of events, inputs, outputs 406, incongruities identified by other behavioral agents 410, an override provided by a trainer (such as the individual), etc.

Alternatively, in task-specific sourcing (TSS) 420, data in behavioral agent 410-1 is processed by predefined control logic (CL) 428 that is coded for a particular task (such as identifying a person based at least in part on a data structure of previous encounters with different people). Note that this processing may be proprietary or may be provided by a third-party resource, and may or may not include accessing online or networked systems, databases, and/or data structures. Once again, monitor 412 may record the inputs and/or output(s) from behavioral agent 410-1, and may store this information in the data structure in memory 428.

Moreover, in intelligent machine sourcing (IMS) 422, over time behavioral agent 410-1 that is user sourced 418 may record enough data that can serve as a training dataset for a reasonably accurate predictive model (PM) 430, such as a predictive model having an accuracy that is greater than 0.5, 0.7, 0.8, 0.9 or 0.95. When a machine-learning technique has been identified and trained to an adequate level (e.g., sufficient accuracy), predictive model 430 may be used to source behavioral agent 410-1 and the user will no longer be prompted for a response or an input. Note that one or more different predictive models may be applied to behavioral agent 410-1 so that, as data is collected and training continues, a more accurate or suitable model may be substituted for an existing predictive model.

Furthermore, combinations of user sourcing 418 and intelligent machine sourcing 422 (which is sometimes referred to as 'hybrid human and intelligent machine sourcing') may be used. Notably, system developers and/or administrators may not immediately be comfortable delegating user decisions to predictive model 430. In this case, as an interim approach, the user may be prompted as in user sourcing 418, but with values provided by predictive model 430, so that the user can decide whether or not to override them. This approach may provide additional training for behavioral agent 410-1, and may provide an interim stage during which behavioral agent 410-1 is tested and its behavior understood before it is given complete control over its action(s). Once again, monitor 412 may record the inputs and/or output(s) from behavioral agent 410-1, and may store this information in the data structure in memory 428. For example, monitor 412 may emphasize cases where a human-sourced input or action is different from the values provided by predictive model 430.

In some embodiments of agent system 400, at least some of behavioral agents 410 may be replaced by one or more predictive models.

Figure 5:
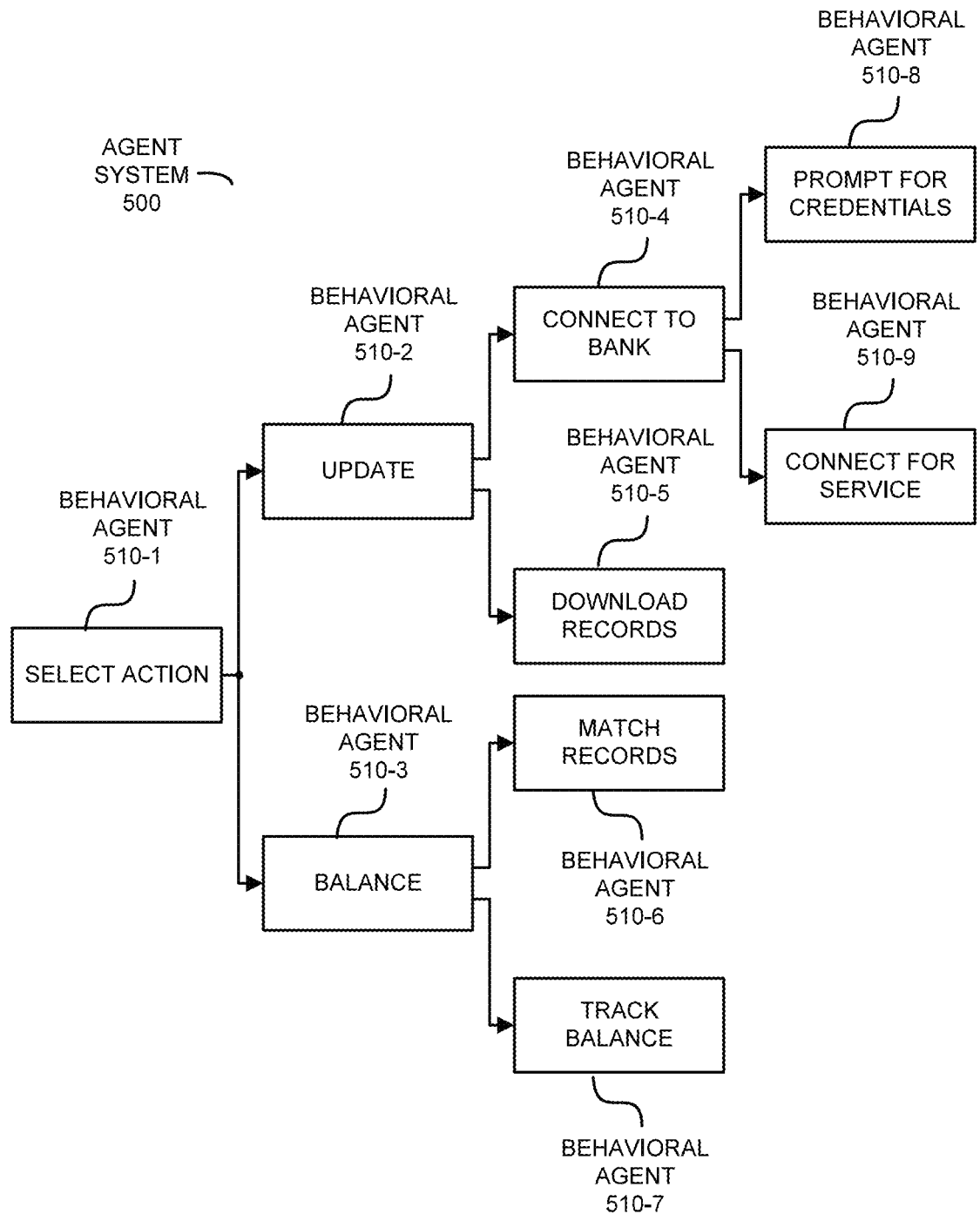
FIG. 5 is a block diagram illustrating an agent system in accordance with an embodiment of the present disclosure.

FIG. 5 presents a block diagram illustrating an agent system 500. In general, note that the computer system may have multiple instances of a particular behavioral agent (such as different software implementations) working in conjunction with each other in the group of behavioral agents. Moreover, note that the number of behavioral agents and their interrelationships or interconnections may change as the software or the computer system state changes or is adapted.

In FIG. 5, behavioral agents 510 are arranged into a multi-layer hierarchy that provides a checkbook ledger. In the discussion that follows, different arrangements or ways of organizing behavioral agents 510 are described as illustrative examples. Notably, behavioral agents 510 may be organized in variety of ways, including: a static behavioral agent organization, a dynamic, dependency-driven behavioral agent organization or in an intelligent behavioral agent organization.

In a static behavioral agent organization, the behavioral agents may be configured or organized in a specific, programmed order or arrangement. As noted previously, a user interface with interactions provided by or to one or more of the behavioral agents may be presented in a common user interface, screen or dialog.

In a dynamic, dependency-driven behavioral agent organization the software may be responsive to user input(s) and/or the application state. As shown in FIG. 4, a given behavioral agent may have one or more dependencies or inputs. Moreover, these dependencies or inputs may be statically defined (such as at the programming or compiling time) or may be dynamically set (e.g., based at least in part on the software or the computer-system state). Given a multi-layer hierarchy of behavioral agents, in order to achieve a particular result or output for a given behavioral agent, dependencies (and, thus, dependent parameter data) among the behavioral agents may be dynamically defined or specified. In this way, a group of behavioral agents with a particular data exchange may be automatically constructed by the computer system. As noted previously, the behavioral agents may be static or dynamic instances that are created and that reflect the software or computer-system state for a particular user session. Consequently, the behavioral agents in the group of behavioral agents may be organized or reorganized from time-to-time, either in scheduled programmatic steps or increments, or in response to changes in the software or the computer-system state.

In an intelligent behavioral agent organization, instead of static and dynamic agents being organized based at least in part on a user-sourced input, once enough training has occurred a behavioral agent may be used to make a programmatic determination of the appropriate behavioral agent organization or arrangement. For example, a behavioral agent (such as a predictive model) may dynamically select the organization or arrangement based at least in part on the quality of the results or outputs provided by the group of behavioral agents.

In some embodiments, after monitoring and collecting a training dataset for one or more behavioral agents, a corresponding predictive model can be used as an input source for the one or more behavioral agents. In principle, an arbitrary number of behavioral agents may be automated using a single predictive model. Consequently, the data collected from multiple behavioral agents may be used to train the predictive model. For example, the predictive model may be trained using data obtained for a specific or a randomly selected subset of the users. When a predictive model is substituted in as an input source, the individual or their representative may approve the performance of the one or more behavioral agents before the group of behavioral agents is used to provide a dynamic virtual representation in a particular context, such as an interactive conversation with a user.

Note that one or more of the behavioral agents and/or one or more predictive models may be trained using a supervised-learning technique or an unsupervised learning technique (such as clustering). For example, a given behavioral agent or a given predictive model may be trained by using one or more machine-learning techniques or may be a particular type of machine-learning model, such as: a neural network (such as a convolutional neural network or a recurrent neural network), a support vector machine, a classification and regression tree, logistic regression, LASSO, linear regression and/or another (linear or nonlinear) supervised-learning technique. Moreover, the output(s) from the group of behavioral agents may have: invariance to specific transformations (e.g., similarity transformations, affine transformations, etc.), robustness to photometric distortions, lighting conditions and noise, computational efficiency, and/or, depending on the particular task, the ability to generalize to feature or object categories.

As noted previously, in some embodiments a given behavioral agent or a given predictive model includes a neural network. Well-trained neural networks with suitable architectures and training have shown promise in solving problems, such as image recognition, game automation, pattern matching and automated driving. While powerful, these neural networks and advanced predictive models often have limitations. Notably, neural networks typically need a large amount of training data in order for the neural network to have suitable performance. In addition, neural networks usually have extreme topical specificity. The disclosed interaction technique leverages the strengths of neural networks while addressing their weakness by combining many neural networks (and, more generally, behavioral agents) into a cooperative network or multi-layer hierarchy in which each of the neural networks uses their specific training for the benefit of the overall performance.

In the multi-layer hierarchy, the group of behavioral agents may provide a human-AI platform or 'nervous system' for the dynamic virtual representation. Initially, the human-AI platform may be based at least in part on behavioral agent-based collaborations and workflows. In subsequent versions or implementations, decentralized, trusted and self-learning behavioral agents may be used. Eventually, the group of behavioral agents may provide emergent collective intelligence.

The multi-layer hierarchy may also provide symbolic and predictive reasoning. Initially, this reasoning may be based at least in part on backward chaining of natural language processing and intent prediction. Subsequent versions or implementations may use content streaming, facial recognition and/or real-time learning. Eventually, the group of behavioral agents may use deep-learning processing and generation to train and provide the reasoning capability.

Moreover, as described further below with reference to FIGS. 6-16, the multi-layer hierarchy may provide composure, in the form of dynamic interactive training (which is sometimes referred to as 'MindQuest') and the dynamic virtual representation (or MindTwin). Initially, these capabilities may be based at least in part on video interview playback. Subsequent versions or implementations may use enhanced video processing, normalization and morphing. As described further below with reference to FIGS. 17 and 18, in some embodiments the interaction technique may leverage a face-off technique and/or a multi-dimensional puppet, so that the dynamic virtual representation provide photorealistic movement behavior of the individual, which may further enhance the user experience. Eventually, the group of behavioral agents may use deep-learning processing and generation to train and provide the composure.

Furthermore, the multi-layer hierarchy may provide perception, in the form of a human-AI video interface. Initially, the perception may be provided via a Internet-based video chatbot. Subsequent versions or implementations may use a native mobile application for MindQuest and MindTwin. Other embodiments may use: a web browser plugin, a desktop application, an augmented reality headset, a virtual reality headset, communication with a computer, etc.

We now describe some examples of a group of behavioral agents and the one or more attributes that are mimicked. In a first example, the group of behavioral agents is used to provide predictive emotional modeling. Notably, a long short term memory (LSTM) network is a type of recurrent neural network that uses an accumulated state from one or more previous iterations to predict the next state. An LSTM may be trained with curated video footage of people experiencing specific emotions to learn how to predict how to convey the same emotion in a simulation of the individual. This capability may be used by the computer system in response to a conversational context to extend or provide an appropriately empathetic emotional response during a conversation. The disclosed computer system may collect footage from hours of conversational data, which may allow a trainer (such as one or more behavioral agents) to categorize the emotional state and to iteratively train an LSTM to respond to non-verbal emotional cues of a user in an appropriate way.

In a second example, the group of behavioral agents is used to perform facial recognition. Some current facial recognition techniques use a convolutional neural network to reduce an individual's image to a statistical probability that the individual's identity is known. The disclosed computer system may use at least five different facial recognition neural networks to provide a high degree of certainty that, if a conversation is occurring with a known user, the computer system can recall who they are and the prior interaction history (such as what has been discussed previously or how the user was introduced to the computer system).

In a third example, the group of behavioral agents is used to provide realistic body movement. Notably, each of us has a unique way of moving and expressing ourselves when we speak or communicate. In some embodiments of the interaction technique, a generative adversarial network is used to to train a group of behavioral agents that provides a dynamic virtual representation having facial movements, body movements and quirks that are approximately indistinguishable from those of the original individual. Once again, the computer system may capture a conversation with the individual, may label the content (using, e.g., a recurrent neural network) to identify emotion(s), emotional prosody, and/or emphasis while the individual is speaking. This footage may be used to train a first neural network (which is sometimes referred to as a 'generator') that mimics the individual as measured by a second neural network (which is sometimes referred to as a 'discriminator') that evaluates how close the generator is to faithfully or accurately mimicking the one or more attributes of the individual. In this way, the computer system can, if given suitable contextual drivers such as emotion, as well as hints for tone and emotional prosody, provide a dynamic virtual representation in which the body, head and/or face move or replicate the motions of the individual. Thus, using a conversation or interaction between the individual and the computer system, the computer system may capture features from the conversation that are used to train a dynamic virtual representation that accurately mimics the behaviors or attributes of the individual.

In some embodiments, a group of behavioral agents may be implemented using one or more convolutional neural networks. A large convolutional neural network may include 60 M parameters and 650,000 neurons. The convolutional neural network may include eight learned layers with weights, including five convolutional layers and three fully connected layers with a final 1000-way softmax or normalized exponential function that produces a distribution over the 1000 class labels. Some of the convolution layers may be followed by max-pooling layers. In order to make training faster, the convolutional neural network may use non-saturating neurons (such as a local response normalization) and an efficient dual parallelized GPU implementation of the convolution operation. In addition, in order to reduce overfitting in the fully-connected layers, a regularization technique (which is sometimes referred to as 'dropout') may be used. In dropout, the predictions of different models are efficiently combined to reduce test errors. In particular, the output of each hidden neuron is set to zero with a probability of 0.5. The neurons that are 'dropped out' in this way do not contribute to the forward pass and do not participate in backpropagation. Note that the convolutional neural network may maximize the multinomial logistic regression objective, which may be equivalent to maximizing the average across training cases of the log-probability of the correct label under the prediction distribution.

In some embodiments, the kernels of the second, fourth, and fifth convolutional layers are coupled to those kernel maps in the previous layer that reside on the same GPU. The kernels of the third convolutional layer may be coupled to all kernel maps in the second layer. Moreover, the neurons in the fully connected layers may be coupled to all neurons in the previous layer. Furthermore, response-normalization layers may follow the first and second convolutional layers, and max-pooling layers may follow both response-normalization layers as well as the fifth convolutional layer. A nonlinear model of neurons, such as Rectified Linear Units, may be applied to the output of every convolutional and fully-connected layer.

In some embodiments, the first convolutional layer filters a 224×224×3 input image with 96 kernels of size 11×11×3 with a stride of four pixels (this is the distance between the receptive field centers of neighboring neurons in a kernel map). Note that the second convolutional layer may take as input the (response-normalized and pooled) output of the first convolutional layer and may filter it with 256 kernels of size 5×5×48. Furthermore, the third, fourth, and fifth convolutional layers may be coupled to one another without any intervening pooling or normalization layers. The third convolutional layer may have 384 kernels of size 3×3×256 coupled to the (normalized, pooled) outputs of the second convolutional layer. Additionally, the fourth convolutional layer may have 384 kernels of size 3×3×192, and the fifth convolutional layer may have 256 kernels of size 3×3×192. The fully-connected layers may have 4096 neurons each. Note that the numerical values in the preceding and the remaining discussion below are for purposes of illustration only, and different values may be used in other embodiments.

In some embodiments, the convolutional neural network is implemented using at least two GPUs. One GPU may run some of the layer parts while the other runs the remaining layer parts, and the GPUs may communicate at certain layers. The input of the convolutional neural network may be 150,528-dimensional, and the number of neurons in the remaining layers in the convolutional neural network may be given by 253, 440-186, 624-64, 896-64, 896-43, and 264-4096-4096-1000.

Training of a Dynamic Virtual Representation

As discussed previous, a dynamic virtual representation or a MindTwin may be used to automatically mimic one or more attributes of an individual, such as mannerisms, a sense of humor, facial expressions, another aspect of their personality, etc. Moreover, the dynamic virtual representation may also have access to or may embody memories of the individual. Furthermore, the dynamic virtual representation may be trained using a dynamic and intuitive interaction between the individual and the computer system, which, as noted previously, is sometimes referred to as MindQuest.

Figure 6:
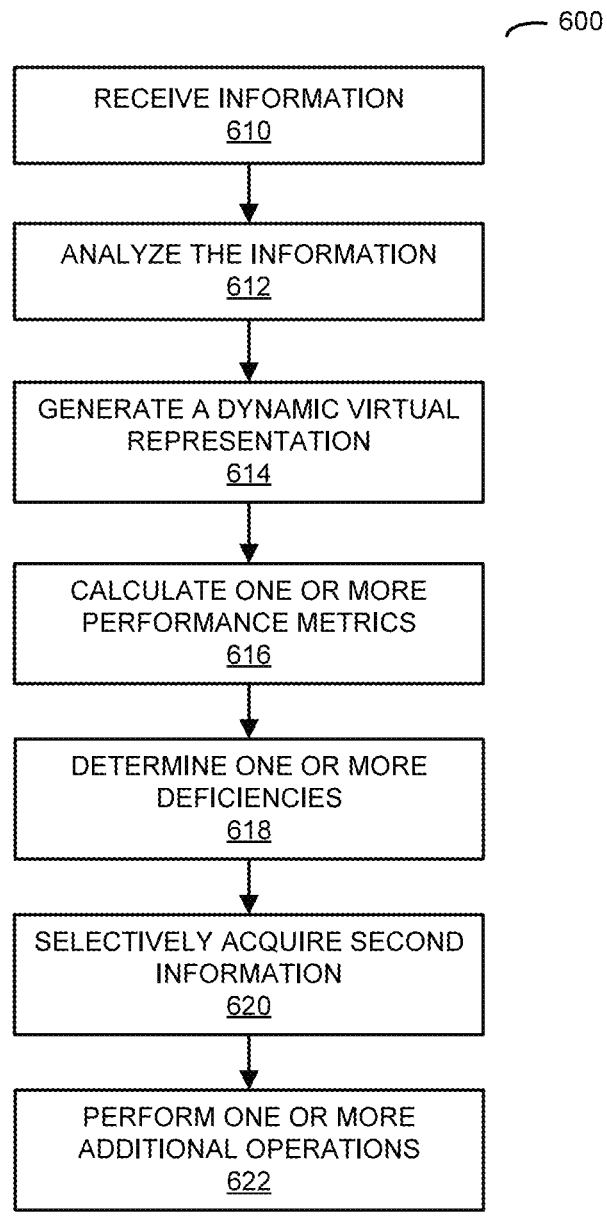
FIG. 6 is a flow diagram illustrating a method for dynamically and intuitively aggregating a training dataset in accordance with an embodiment of the present disclosure.

FIG. 6 presents a flow diagram illustrating a method 600 for dynamically and intuitively aggregating a training dataset, which may be performed by a computer system (such as computer system 118 in FIG. 1). Notably, the computer system may include a computation device that performs method 600. For example, the computation device may include one or more of: a processor, one or more cores in a second processor, or another type of device that performs computation (such as a GPU).

During operation, the computer system may receive information (operation 610) associated with an interaction with an individual in a context. For example, the information (such as one or more input stimuli) may include: one or more images (such as video), sound (such as audio), writing, an anatomic response (such as a vital sign), a user-selection from a human interface, neuronal signals, and/or another type of measurement (such as a haptic measurement). Moreover, the context may include interacting with the individual. For example, the interaction may occur between a dynamic virtual representation (which is provided by the computer system and the individual). In some embodiments, the information is associated with an electronic device, e.g., the information may be received from the electronic device. Alternatively, in some embodiments the receiving involves accessing the information in a computer-readable memory.

Then, the computer system may analyze the information (operation 612) to extract features associated with one or more attributes of the individual. For example, the features may include one or more of: spoken or written communication of the individual, an emotion of the individual, non-verbal communication by the individual, a tone, a style or manner of speaking, a gesture, facial expression, a vital sign, body language, a walking style or gait, folded arms or a posture, an eyebrow position or motion, a sudden motion (such as physically recoiling or moving away), a rate or frequency of blinking, a twitch, a gaze direction and/or emotional prosody. Furthermore, the one or more attributes may include one or more of: a behavior, an emotion, a type of humor, a mannerism, a style of speech, a memory or a thought process (such as a way of thinking or a making a decision). Note that the analysis may be performed in real time (as the information is received) or in near real time (such as from a buffer) based at least in part on the available resources in the computer system.

Moreover, the computer system may use the extracted features to generate (or train) a dynamic virtual representation (operation 614) using a group of behavioral agents in a multi-layer hierarchy that automatically mimics the one or more attributes of the individual, where a given behavioral agent receives one or more inputs and provides an output corresponding to one or more of the extracted features, and where the inputs to at least some of the behavioral agents include outputs from one or more of the other behavioral agents. Note that the given behavioral agent may include an artificial neural network.

Next, the computer system may calculate one or more performance metrics (operation 616) associated with the dynamic virtual representation and the one or more attributes. For example, a given performance metric may access the accuracy of a given attribute that is mimicked by the dynamic virtual representation. Notably, the given performance metric may correspond to a difference or an error between a simulated attribute and the given attribute. A variety of performance metrics may be used, such as: an absolute error, a relative error, a weighted error, a maximum error, a mean or an average error, and/or a score based at least in part on estimated or actual reactions to the dynamic virtual representation by one or more users.

Furthermore, based at least in part on the one or more performance metrics, the computer system may determine one or more deficiencies (operation 618) in the extracted features.

Additionally, the computer system may selectively acquire second information (operation 620) associated with additional interaction with the individual in the context based at least in part on the one or more deficiencies, where the second information at least in part corrects for the one or more deficiencies, and where acquiring the second information involves provoking specific responses from the individual based at least in part on the one or more deficiencies.

In some embodiments, the computer system optionally performs one or more additional operations (operation 622). For example, using the second information, the computer system may repeat operations 612-618 to generate a revised dynamic virtual representation using the group of behavior agents or a revised group of behavioral agents that have one or more performance metrics that are improved. Notably, the revised dynamic virtual representation may more accurately mimic the one or more attributes, such that one or more differences between the mimicked one or more attributes and one or more corresponding target values may be less than a threshold value (e.g., 1, 5 or 10%). Thus, in some embodiments of method 600, at least some of the operations are performed iteratively until a convergence criterion is achieved.

Moreover, in some embodiments at least a portion of operations 612-618 are performed by a discriminator in a generative adversarial network.

In this way, the computer system (for example, software executed in an environment, such as an operating system, of the computer system) may iteratively and intuitively (e.g., via interaction with the individual) bootstrap a suitable automatically annotated training dataset for the group of behavioral agents. This approach may reduce or eliminate the need for more cumbersome and inaccurate techniques of data collection, and may reduce or eliminate the need to manually annotate the training dataset (such as labeling the extracted features). Therefore, these embodiments of the interaction technique may reduce the use of network bandwidth and computation resources in computer system 100 and network 128 in FIG. 1. Moreover, the bootstrapping capability may allow the group of behavioral agents to be dynamically and intuitively evolved so that the accuracy of the one or more attributes mimicked by the group of behavioral agents is improved over time. In these ways, the interaction technique may simplify the training of the group of behavioral agents while helping to ensure quality control. Consequently, the interaction technique may enhance the user experience and satisfaction of the users of electronic devices 110 (FIG. 1) and/or the individual.

Figure 7:
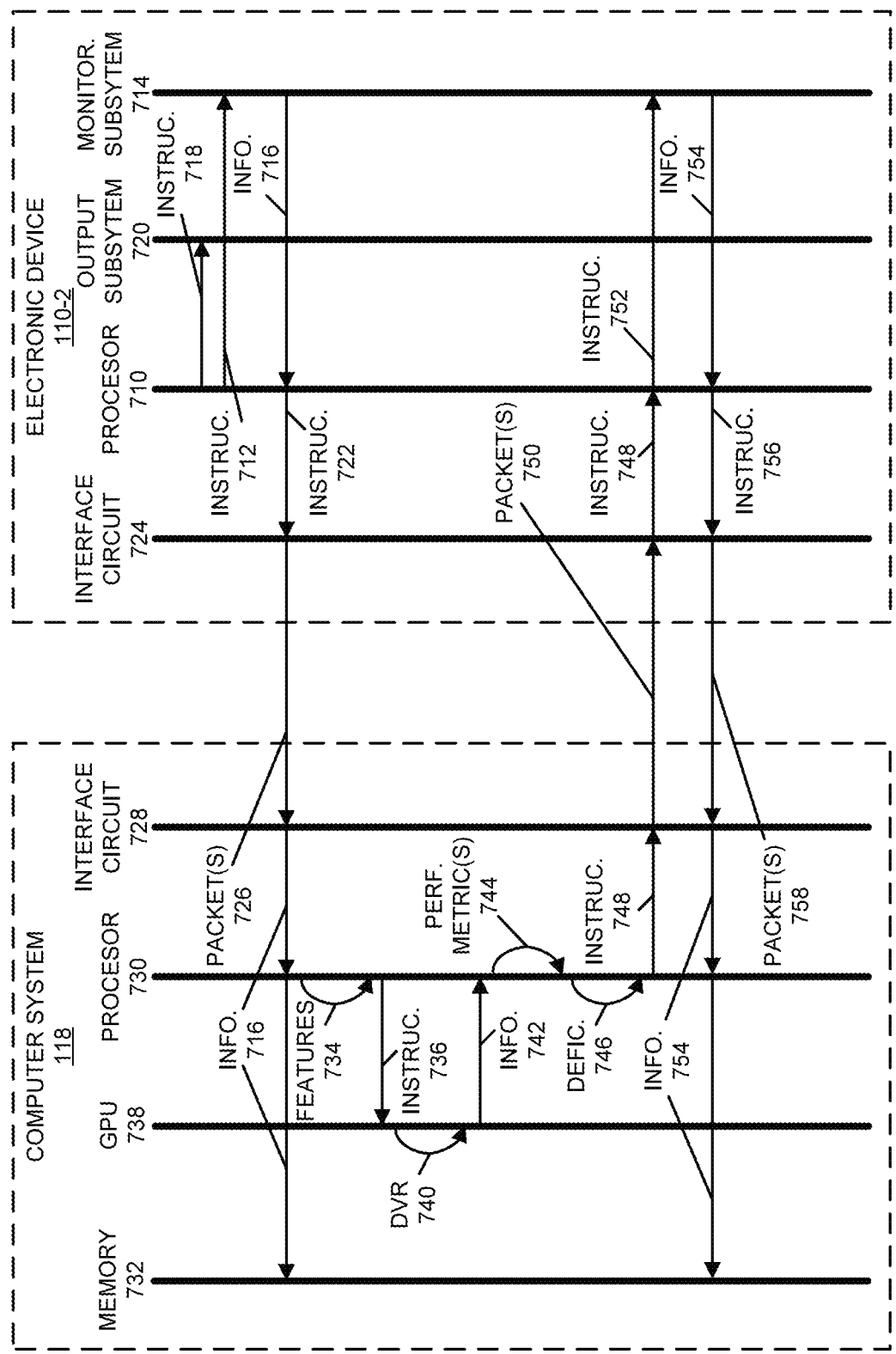
FIG. 7 is a drawing illustrating communication among components in the computer system in FIG. 1 in accordance with an embodiment of the present disclosure.

Embodiments of the interaction technique are further illustrated in FIG. 7, which presents a drawing illustrating communication among components in system 100 (FIG. 1). Notably, during the interaction technique, processor 710 executing program instructions in electronic device 110-2 may instruct 712 one or more sensors in monitoring subsystem 714 to capture information 716 associated with an individual. For example, the information 716 may be captured during an interaction with the individual in a context, such as a conversation or a dialog. During the conversation or dialog, processor 710, executing an application, may instruct 718 output subsystem 720 (such as a display and/or one or more speakers) to provide outputs (such as images, text and/or sound) to the individual, while monitoring subsystem 714 captures the information 716. Alternatively, during the conversation or dialog, computer system 118 and electronic device 110-2 may operate in a client-server architecture. In some embodiments, monitoring subsystem 714 captures the information 716 while the individual is talking to or interacting with another person and/or while the individual is going about their normal daily tasks and activities. Moreover, monitoring subsystem 714 may provide the information 716 to processor 710.

Then, processor 710 may instruct 722 interface circuit 724 to provide one or more packets 726 or frames with the information 716 to computer system 118. After receiving the one or more packets 726, interface circuit 728 in computer system 118 may provide the information 716 to processor 730 in computer system 118. Processor 730 may optionally store the information 716 in memory 732 in computer system 118, where processor 730 can access the information 716.

Moreover, processor 730 may analyze the information 716 to extract features 734 associated with one or more attributes of the individual. Next, processor 730 may instruct 736 GPU 738 to generate a dynamic virtual representation (DVR) 740 of the one or more attributes of the individual using a group of behavioral agents, where the dynamic virtual representation 740 automatically mimics the one or more attributes of the individual.

Furthermore, GPU 738 may provide information 742 corresponding to the dynamic virtual representation 740 to processor 730. Processor 730 may calculate one or more performance metrics 744 associated with the dynamic virtual representation and the one or more attributes. Additionally, based at least in part on the one or more performance metrics 744, processor 730 may determine one or more deficiencies 746 in the extracted features 734.

Based at least in part on the one or more deficiencies 746, processor 730 may selectively provide instructions 748 to selectively acquire additional information to interface circuit 728, which provides the instructions 748 in one or more packets 750 or frames. After receiving the one or more packets 750, interface circuit 724 may provide instructions 748 to processor 710. Then, processor 710 may instruct 752 monitoring subsystem 714 to capture information 754 during another interaction with the individual in the same or another context, such as another conversation or another dialog. Note that during the other interaction, the individual may be prompted or provoked to provide specific responses to at least in part corrects for the one or more deficiencies 746.

Next, monitoring subsystem 714 may provide the information 754 to processor 710. In response, processor 710 may instruct 756 interface circuit 724 to provide one or more packets 758 or frames with the information 754 to computer system 118. After receiving the one or more packets 758, interface circuit 728 may provide the information 754 to processor 730. Processor 730 may optionally store the information 754 in memory 732, where processor 730 can access the information 754.

While not shown in FIG. 7, computer system 118 may subsequently optionally repeat one or more operations using the information 754, such as: extracting additional features, generating a revised dynamic virtual representation, calculating one or more additional performance metrics, determining one or more additional deficiencies (if any), etc., until a dynamic virtual representation with suitable accuracy in mimicking of the one or more attributes is obtained.

While FIG. 7 illustrates unilateral communication between components, in some embodiments one or more of these communication operations involve bilateral communication.

In some embodiments, the computer system analyzes information acquired or captured during the monitoring or interaction with the individual using: an image-processing technique, an acoustic analysis technique (such as a discrete Fourier transform, Cepstrum analysis, linear predictive coding, and/or another speech acoustic analysis technique), a writing analysis technique (such as a graphology handwriting analysis), optical character recognition, etc. The image-processing technique may include one or more of: an edge or a line-segment detector, a texture-based feature detector, a texture-less feature detector, a scale invariant feature transform (SIFT)-like object-detector, a speed-up robust-features (SURF) detector, a binary-descriptor (such as ORB) detector, a binary robust invariant scalable keypoints (BRISK) detector, a fast retinal keypoint (FREAK) detector, a binary robust independent elementary features (BRIEF) detector, a features from accelerated segment test (FAST) detector, a motion detector (such as a Gaussian-mixture model), etc. Note that, in some embodiments, the analysis is based at least in part on: a location of a light source with the information is acquired, a signal-to-noise ratio of the information, a histogram of the light intensity in one or more acquired images, an f-number of an image sensor that acquired the information, another metric of the light intensity in one or more acquired images, an image-quality metric of the one or more acquired images, etc.

Moreover, in some embodiments the computer system (via the electronic device) captures the information by monitoring and/or receiving video and audio during the context. Then, the computer system may perform a variety of analysis techniques on the information. For example, the computer system may perform audio processing. During the audio processing, the computer system may convert speech to text. Then, the computer system may perform natural language processing and classification on the text. Moreover, the computer system may select or generate a response, and may, via the electronic device, provide audio and video corresponding to the response to the individual or a user.

This approach may allow the individual or the user to have a conversation with a dynamic virtual representation. Note that the processing of the information and the selection and/or generation of responses may be performed continuously by the computer system. Thus, the computer system may receive updated information and may prepare a suitable response on an ongoing basis. Moreover, one or more behavioral agents may be used to analyze pauses between words or sentences in the information, so that the computer system can provide a response to a question without interrupting the individual or the user.

Furthermore, different behavioral agents (such as two behavioral agents) may be used to convert speech to text. These 'daughter' behavioral agents may be evaluated by a 'parent' behavioral agent that logs differences between the daughter behavioral agents to create a training dataset that can be used to replace the parent behavioral agent with an AI-driven behavioral agent that chooses the best response based at least in part on one or more of the text outputs from the daughter behavioral agents.

Additionally, the processing of the information may involve facial recognition. Notably, the computer system may perform facial recognition in images in the information to identify the individual or the user, who may or may not be already known to the computer system. This capability may allow the computer system (such as a dynamic virtual representation) to greet people that it has previously interacted with, as well as to recall concepts and topics that were discussed (and, more generally, the interaction history).

In some embodiments, the computer system uses a variety of behavioral agents to process the information or input stimuli. For example, the computer system may extract features associated with non-verbal communication. Notably, one or more images may be analyzed to determine derivative datasets or features, such as: landmarks (e.g., areas of the face or torso), a vector graph (e.g., a grid of vectors that measures the pace of change for landmarks), normalization of scale and orientation (which can generate a 'frontalized' image of the individual or the user that has a consistent size from frame to frame), etc. Moreover, one or more additional behavioral agents may use the derivative datasets or features to: log and learn about expressions that correlate to concepts, expression and intent; track idle and verbal movement to determine a training dataset of general human movements; detect intent and mood as the individual or the user interacts with a dynamic virtual representation. Thus, the behavioral agents may enrich the conversation with the individual, which may allow better features to be extracted from the acquired information. In these ways, non-verbal communication may used to determine an intent, which may be included in the context to provide a re-enforcement function for the group of behavioral agents, so that a dynamic virtual representation can detect when its attempt to mimic the one or more attributes is confusing or inappropriate.

A variety of techniques may be used to train the group of behavioral agents, so that the group of behavioral agents learns and improves the dynamic virtual representation. For example, initially, the behavioral agents may use a console user interface (i.e., user-input data) to allow a trainer (such as the individual) to curate results and to tag or annotate them. In some embodiments, the trainer tags expressions that reflect mood. Notably, the trainer may tag expressions that reflect: anger, curiosity, surprise, sadness, regret, laughter, happiness, interest, confusion, etc. This curated dataset may be used to iteratively train the group of behavioral agents so that it correctly identifies mood based at least in part on expressions.

Moreover, other behavioral agents may be set up in an adversarial role to re-enforce the training of new behavioral agents, so that, over time, the accuracy of behavioral agents that automatically infer intent from expression is high. As these behavioral agents are used, they can enhance the context, so that other behavioral agents in the group of behavioral agents can take advantage of the updated context and can enrich it in their area of specific expertise.

In addition to being a portion of the reasoning platform, at least some of the behavioral agents may be used to inform avatoid layer as well. For example, a subset of the behavioral agents may be inserted into the process that captures subject movement, expressions and behaviors when the dynamic virtual representation is being trained. The resulting behaviors of the group of behavioral agents can be both specific and global. Stated different, the group of behavioral agents may provide a subject-specific training dataset and may contribute to a larger training dataset. In this way, the computer system can develop behavioral agents that can drive the avatoid in a general way, but that can also be enriched with an individual's iconic or idiomatic quirks of movement and expression. This capability may involve behavioral agents that learn about and drive movement, word use, tone of expression, and signets or habitual stories, expressions, turn of phrase, etc.

We now describe a technique for recording of personality features and memories for use in training a dynamic virtual representation. The creation of a personal dynamic virtual representation that can act, without the constraints normally associated with human attention spans, ability to concentrate, and/or the limitations of consistency, is among the broader ambitions of computational technology. The disclosed interaction technique allows the dynamic virtual representation to accurately mimic anthro-centric notions of personality, desires, character, feelings, and imagination.

The goal of creating a personal dynamic virtual representation with an indistinguishable difference or sufficient similarity to the attributes of a real human (i.e., the individual) can enable the dynamic virtual representation to perform tasks or actions on behalf of the individual. This capability may allow the individual to have more freedom of action or may extend their opportunities for effective action, as though they performed these actions personally.

In order to create a dynamic virtual representation (in the accuracy can be calibrated and corroborated through testing), a training dataset, which is measurable, objective, and repeatable, may be needed. Given the existence of various digital technologies for capturing aspects of human behavior and personality, and personal memories, and that these digital technologies and the associated media are typically accepted as authoritative when authorship and origin can be verified, the interaction technique may use these digital technologies as sources of the training dataset. Moreover, when data is sourced from the digital technologies and the associated media (such as a video interview using digital video and audio), it is usually accepted that the fidelity of the resulting dynamic virtual representation cannot be higher than that of the original media. Therefore, if the individual is deceptive while the training dataset is recorded, their statements will be recorded as 'true.' Consequently, in the interaction technique additional measures may be used to determine the quality of the training dataset and its limitations, validation and, if needed, correction.

Figure 8:
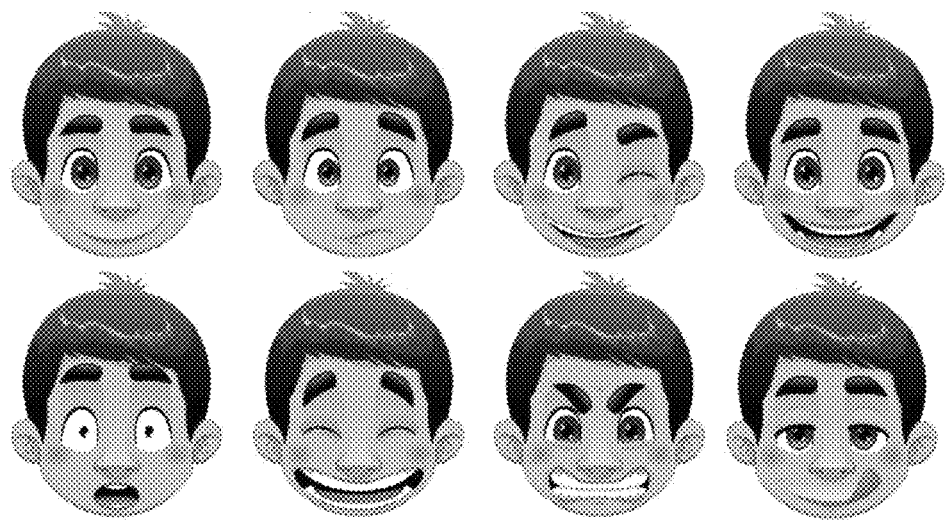
FIG. 8 is a drawing illustrating a range of human emotions in accordance with an embodiment of the present disclosure.

During the acquisition or aggregation of the training dataset, the computer system may capture short and long-term emotional responses as expressed in video-based interviews (including audio and video). In general, the range of emotions and facial expression can vary greatly from individual to individual, and as a function of time. FIG. 8 presents a drawing illustrating a range of human emotions.

Figure 9:
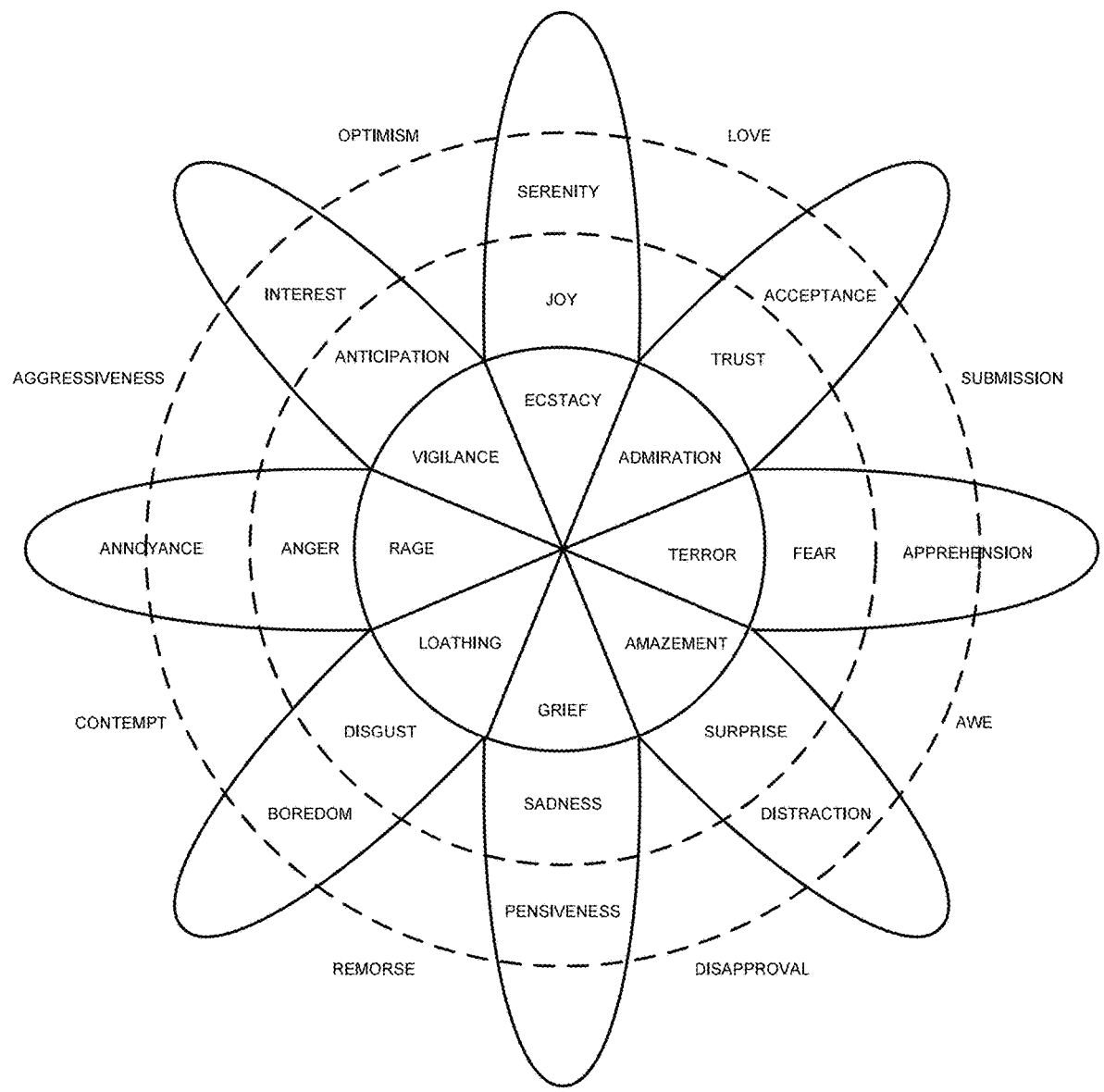
FIG. 9 is a drawing illustrating categories of human emotions in accordance with an embodiment of the present disclosure.
Figure 10:
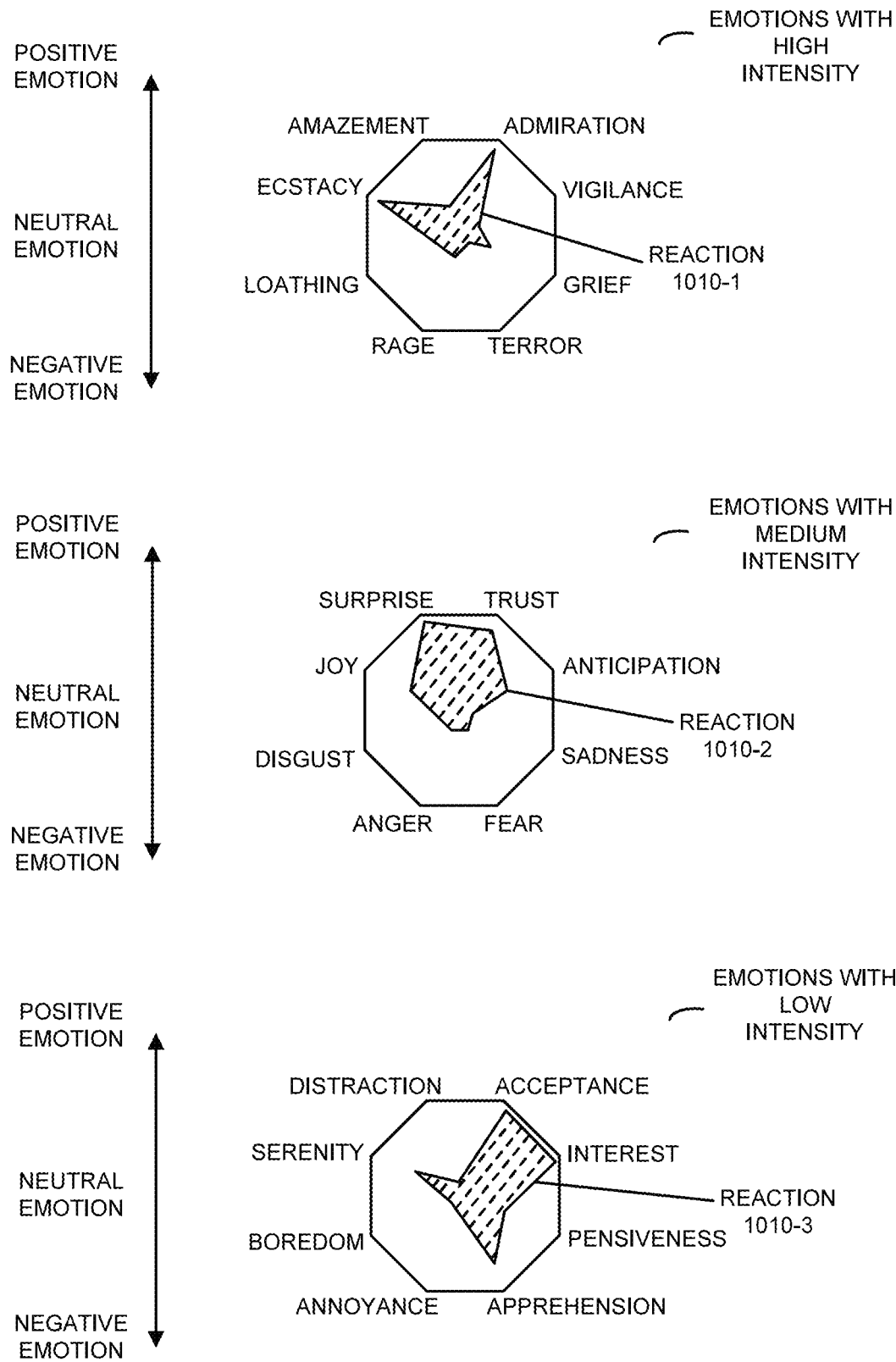
FIG. 10 is a drawing illustrating projections of different human behaviors on a basis set of human emotions in accordance with an embodiment of the present disclosure.

Using the captured video and audio, the computer system may categorize or classify facial expressions and emotional cues in an individual's speech. For example, Plutchik's emotional categories may provide a framework for relating emotional states and affectedness. FIG. 9 presents a drawing illustrating categories of human emotions, and FIG. 10 presents a drawing illustrating projections or mapping of different human behaviors (such as reactions 1010 of a user or the individual) on a basis set of human emotions. Note that this classification approach may identify so-called micro-expressions. Micro-expressions are thought to be pre-verbal and unconscious expressions that may provide additional data (beyond a primary, lasting expression) about a user or the individual's emotional state and/or its causes.

Moreover, during the acquisition or aggregation of the training dataset, the computer system may correlate speech and physiognomy (e.g., a person's facial features and expressions) to establish an emotional score for the individual. For example, the computer system may use speech patterns and physiognomy as inputs to a Bayesian network or a neural network that provides an emotional score.

Furthermore, the emotion or emotional state of the individual may be estimated based at least in part on the individual's writing and/or verbal responses. For example, the computer system may request that the individual perform a series of one or more operations, such as describing their personal life and feelings through stories and game-like activities. As noted previously, this interactive process is sometimes referred to as MindQuest.

Figure 11:
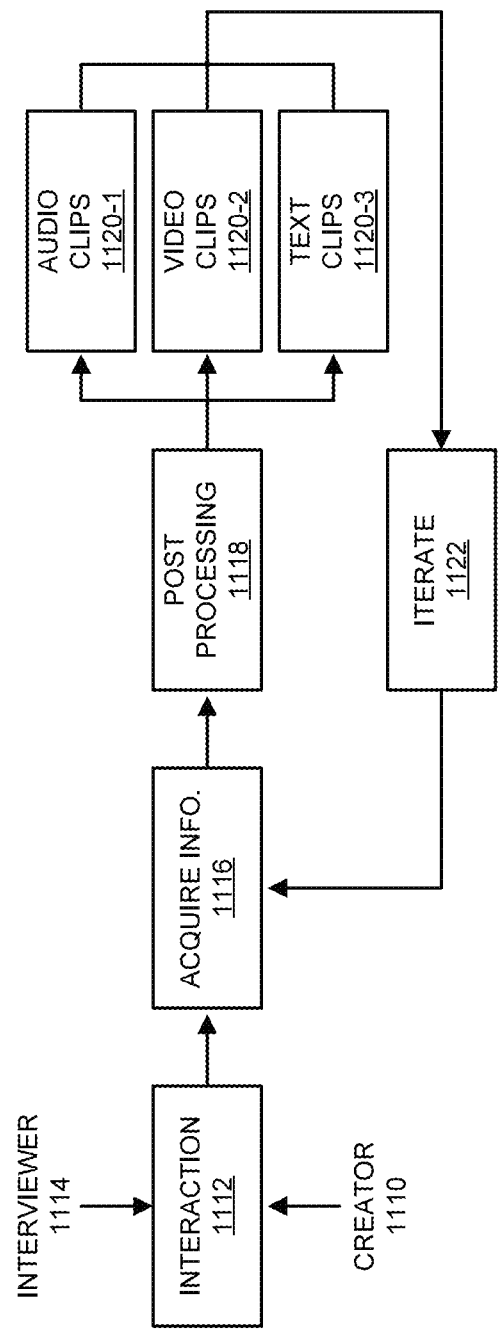
FIG. 11 is a drawing illustrating a process for dynamically and intuitively aggregating a training dataset in accordance with an embodiment of the present disclosure.

A MindQuest journey is illustrated in FIG. 11, which presents a drawing illustrating a process for dynamically and intuitively aggregating a training dataset, which may be performed, at least in part, by the computer system. In this process, a creator 1110 (such as the individual) may interact 1112 with an interviewer 1114 (which may be a human and/or software). During this interaction, information (such as audio and video of both sides of interaction 1112) may be acquired 1116. Then, post processing 1118 may be performed. For example, speech may be converted to text. Moreover, the creator responses may be edited into clips 1120 (such as audio, video and text), which may be stored in a dialog library. This dialog library may map expected conversational inputs from users to video clips that include responses. The interview process may be iterated 1122 to expand and enhance the dialog library.

In some embodiments, an adversarial process is used during the interviews. Notably, an adversarial conversation or 'challenge' can produce a unique set of behaviors or responses from the individual. This approach may allow the computer system to develop the training dataset by having the individual repeat behaviors in a nonidentical manner. This diversity in the training dataset may allow the computer system to establish repeatable personality cues in different contexts. For example, the computer system may ask "Will a person support free health care for all?" when questioning "Should wealthy individuals should be fined excessively for minor crimes?" This adversarial approach may lead to the individual to provide a response that reinforce strongly held beliefs when they are challenged (e.g., with a negative challenge).

Figure 12:
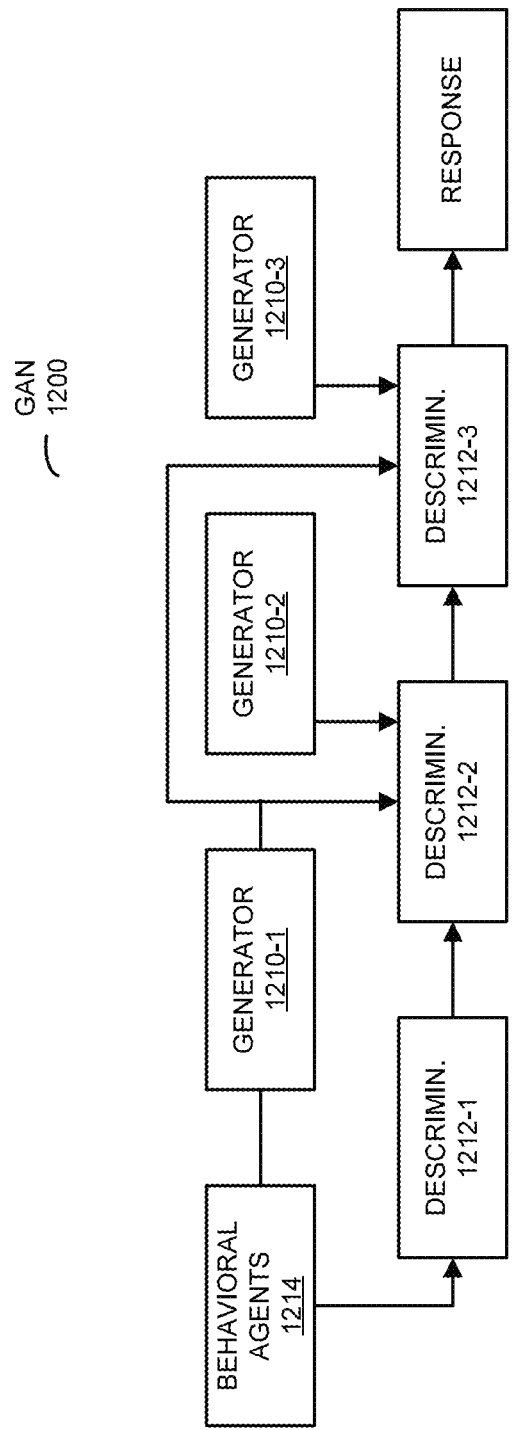
FIG. 12 is a block diagram of a generative adversarial network using generators and discriminators from trained behavioral agents in accordance with an embodiment of the present disclosure.

In some embodiments, the individual's beliefs and feelings may be determined through questions and answers, which then may be used as a training dataset for a generative adversarial network. This is shown in FIG. 12, which presents a block diagram of a generative adversarial network (GAN) 1200 using generators 1210 and discriminators 1212 from trained behavioral agents 1214.

In an example of a dialog between a creator and an interviewer, a conversation of dialog may concern a game entitled "nicknames." The goal of the interviewer is to build a set of words that are associated with each of the main emotional categories when they are used as nicknames. The interviewer may determine the corresponding emotional level based at least in part on what it knows about the reaction of the creator and a predictive model that assumes that successive negative reactions tend to build on or reinforce each other, even if they are equivalent when used in isolation. Moreover, in this example, a strong reaction (such as a laugh or angry outburst) may eventually tend back toward a neutral response over time unless the interviewer attempts to continue to provoke the strong reaction.

In an example of the dialog, the interviewer may ask: "You seemed a little slow to answer that last question. Does it bother you if I say that?"

The creator may respond: "No."

In this case, the interviewer may indicate: "Ok. What if we use the nickname 'Slow' for you? Such as, "Hey, Slow, let's get on with the next set of challenge questions to see if you can do any better."

If the creator responds "No, I don't like that either," then the interviewer may answer: "I'm just a dumb bot that really needs to learn how to argue. Is there a problem with the nicknames or is it just the one I picked?"

This gives the creator an opportunity to provide seamless feedback to the interviewer. For example, the creator may say: "Nicknames can be fun, but they can also be harmful. 'Slow' is a harmful nickname."

In response, the interviewer may ask: "How about 'sluggish'?"

"No, that is also bad," the creator may say.

So the interviewer may ask: "How about 'Stagnant'?"

The creator may indicate: "That's even worse. Can you try something positive?"

"What's an example of positive?" the interviewer may ask.

In response, the creator may say: "Intelligent."

Mimicking the creator, the interviewer may say: "Hey Intelligent, let's play a game."

This may result in a positive response from the creator: "OK. That works."

Consequently, through a dynamic and intuitive dialog, the interviewer may be able to elicit a variety of responses from the creator, which the computer system can use to assemble a training dataset, as shown in Table 1, which provides training data during adversarial data generation.

TABLE 1

| Term | Emotion | Emotional Score | Net |
|---|---|---|---|
| Slow | Annoyance | −1 | −1 |
| Sluggish | Annoyance | −1 | −1 |
| Stagnant | Angry | −2 | −3 |
| Intelligent | Neutral | +3 | 0 |

Figure 13:
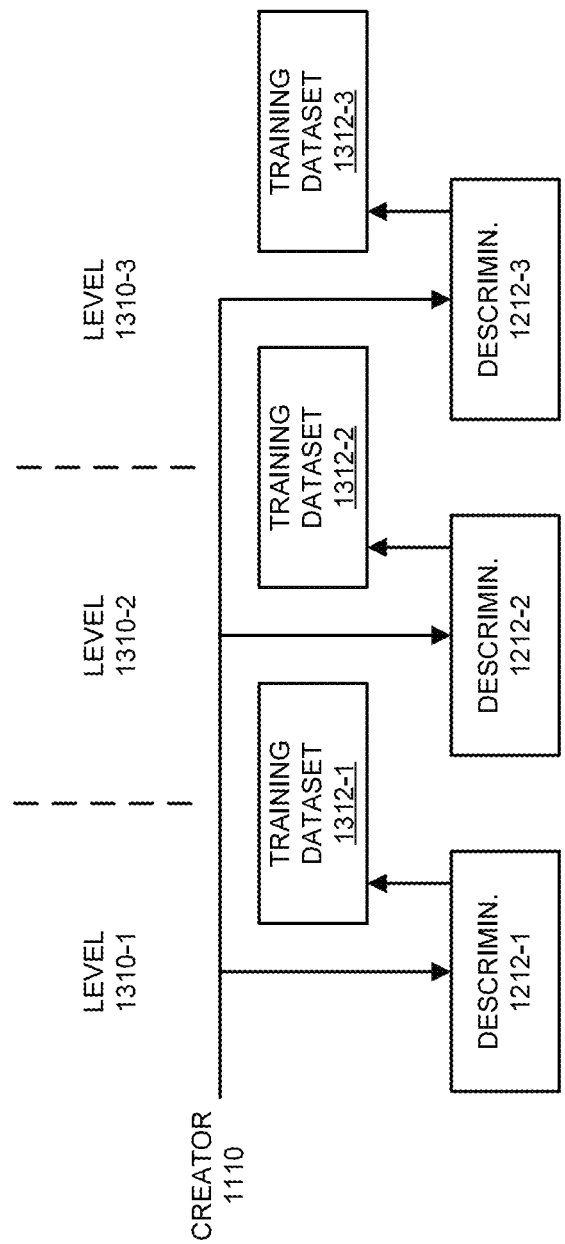
FIG. 13 is a block diagram of training levels during adversarial data generation in accordance with an embodiment of the present disclosure.

The assembly of training datasets is shown in FIG. 13, which presents a block diagram of training levels during adversarial data generation. Notably, responses from creator 1110 may be assessed by discriminators 1212 in different levels 1310 may generate training datasets 1312.

In some embodiments, the computer system uses a memory palace as a memory model for game-level design, so the computer system can determine a training dataset for AI emulation of human memory. Notably, the computer system may identify a memory model the user can easily imagine. Then, the computer system may capture or access information associated with a real location that can be used for memory mapping. Moreover, the computer system may generate a memory map and may train the individual to populate and recall it. For example, the computer system may prompt the individual to 'walk the memory palace' and may take turns with a dynamic virtual representation describing memories and linking them in the memory palace. In this way, the interaction technique may allow the computer system to reinforce the storage and recall of existing memories, and to associate new memories in the memory model.

The premise of a memory palace is as a primitive spatial memory. Humans may have evolved such a primitive spatial memory for survival as a pre-verbal species, because a memory palace provides a high level of detail in conjunction with semantic structures that provides a complete memory model for humans to use to 'store' ideas, experiences (including verbal and/or non-verbal) as 'places' in an imagined space. Moreover, the reinforcement of the memories facilitates long-term and efficient recall, so routine 'walking the memory palace' can help to strengthen the memory model and improve performance.

One objective of the dynamic virtual representation is to establish a highly similar facsimile of the real human subject. Consequently, a memory game may be employed by the computer system to develop a training dataset and a mnemonic structure with high similarity to the memories of the individual, which is simultaneously reinforced by both the individual and the dynamic virtual representation.

Figure 14:
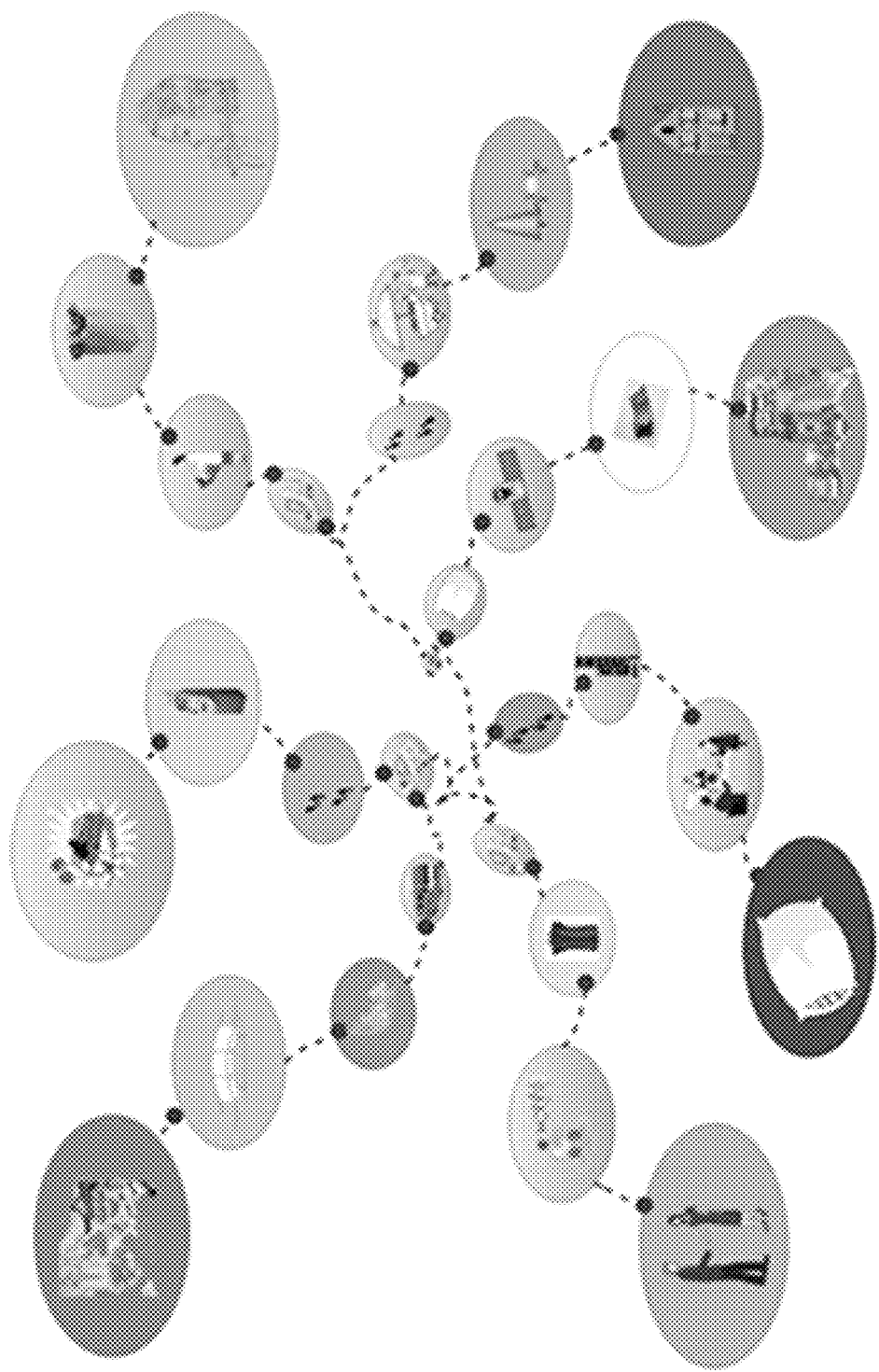
FIG. 14 is a drawing illustrating a memory model based at least in part on free association in accordance with an embodiment of the present disclosure.

In order to build a memory model, an initial memory map is defined. Notably, a set of related memories may be specified by the individual using free association. This is illustrated in FIG. 14, which presents a drawing illustrating a memory model 1400 based at least in part on free association. Note that a memory model based at least in part on free association may support strong linkages among particular events, details, and places.

FIG. 14 illustrates how, with a set of closely associated memories that start in a place, such as a family home, a set of narratives (in this example, seven narratives) can constructed by the individual. The final, outermost, node represents a key memory and the 'Home' memory that is the starting point for recall.

In order to generate the memory model, the computer system may initially invite the individual to freely describe any number of memories associated with a time they lived in a particular place. Then, the computer system may select one of these memories as a key memory and may invite the individual to recall an event that immediately preceded it, and where this event took place. By iteratively repeating these operations, the computer system can invite the individual to 'walk' the memory path to home, effectively recounting a series of memories in reverse order. This process may establish where the memories occurred, which can facilitate subsequent recall.

Moreover, the dynamic virtual representations may play the sequence back to the individual, and may ask them to fill in additional memories or details along the way. In some embodiments, the computer system may use public or personal records of the individual (such as details of major life events or their personal history) to pre-populate a memory model, thereby accelerating the processes of building an accurate memory model.

Furthermore, the computer system may use a predefined rule (such as known significant life events of the individual, e.g., a birthday, a graduation date, wedding date, events in their professional career, when a child was born, etc.) to identify locations in a memory model, may invite the individual to tell a story about a given location, including, but not limited to, the memory walk described previously.

The individual and the dynamic virtual representation may iteratively build the memory model through a series of branching memory walks that are tied, via the memory path, to the home. In this way, the computer system may establish new key memories and may reinforce memory paths through repetition in reverse order.

In some embodiments, maps the memory model to facilitate game play and management. Notably, a spatial or hyper-dimensional overlay, such as hexagonal map or a set of bins, may be used to help anchor key memories in a form of immediacy or serial order. The result may be that a given key memory may have an arbitrary, finite, but extensible set of proximate memories that can be memorized or learned in order. This also facilitates the creation of new memory paths and spatial foundations, such as an actual building or place in the individual's daily life.

For example, a hexagonal map (which is sometimes referred to as 'hex binning') may be used to represent memories as stories with distinct temporal and spatial connections. In this way, narrative structures can be generated to train a dynamic virtual representation, as well as to establish a correctable, regressable, and deeply detailed memory model that can support games or interaction that encourage the individual to recall further detail, enhance, and extend the memory map.

While hex binning has been used to visualize geospatial data, in the interaction technique the 'distance' in each cell may be determined by the topology of the individual's memory. Consequently, the distance in the memory map may or may not correlate to geographical distances. In the interaction technique, the memory map is a cognitive map as opposed to a physical map.

Figure 15:
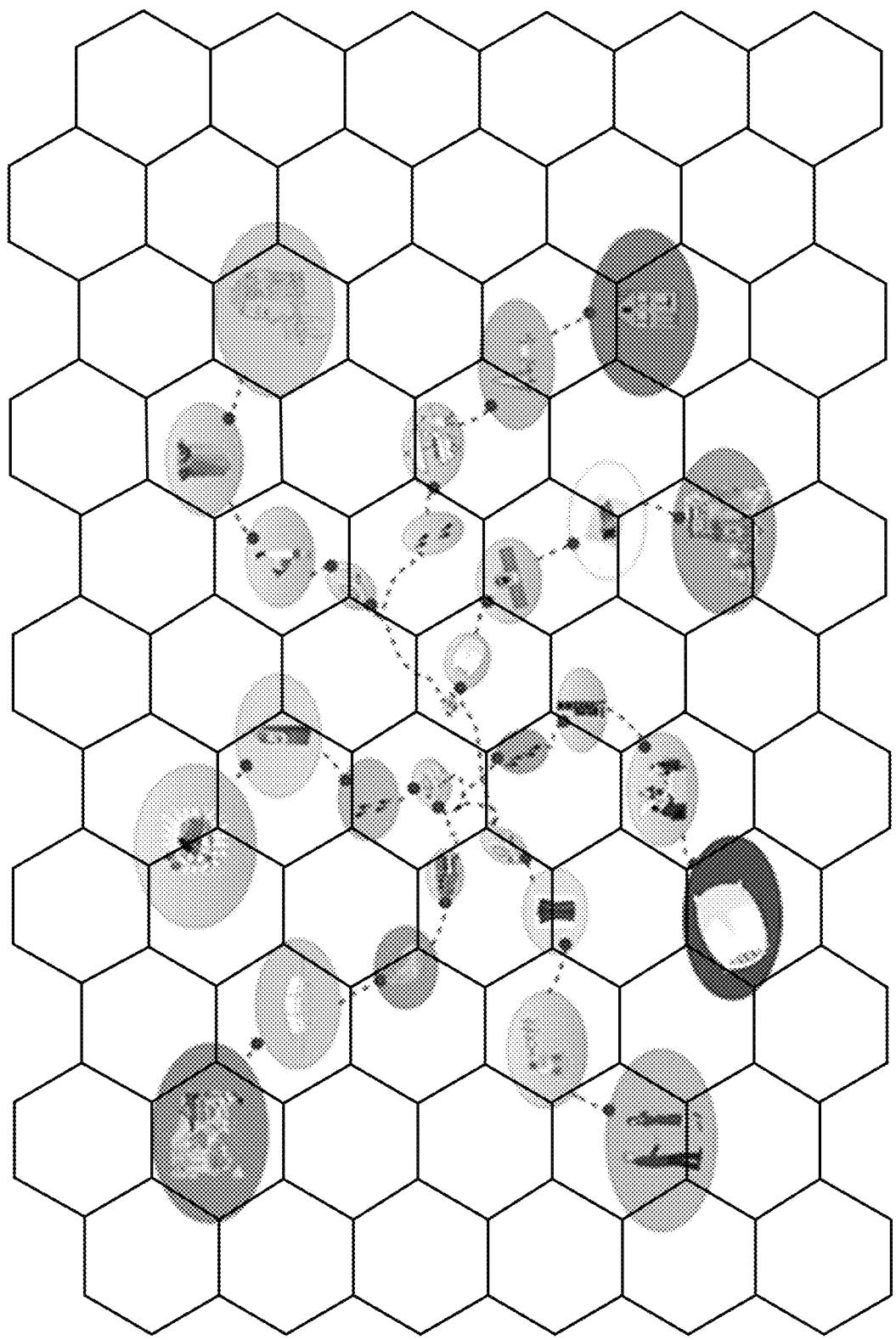
FIG. 15 is a drawing illustrating a relational grid in accordance with an embodiment of the present disclosure.
Figure 16:
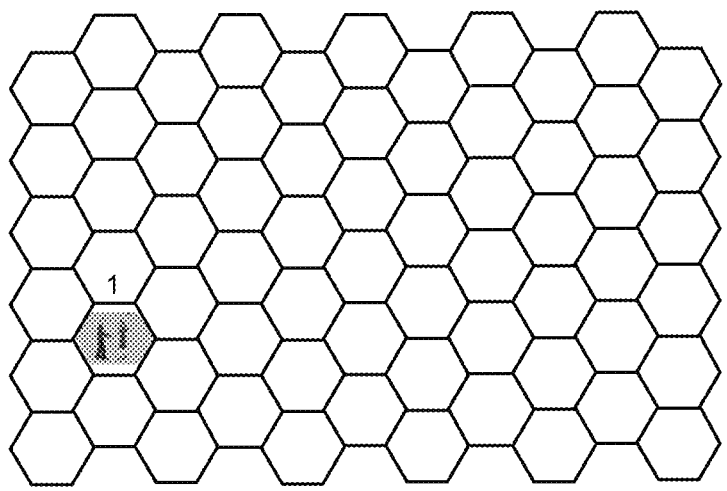
FIG. 16 is a drawing illustrating a process for connecting memories using a relational grid in accordance with an embodiment of the present disclosure.
Figure 16:
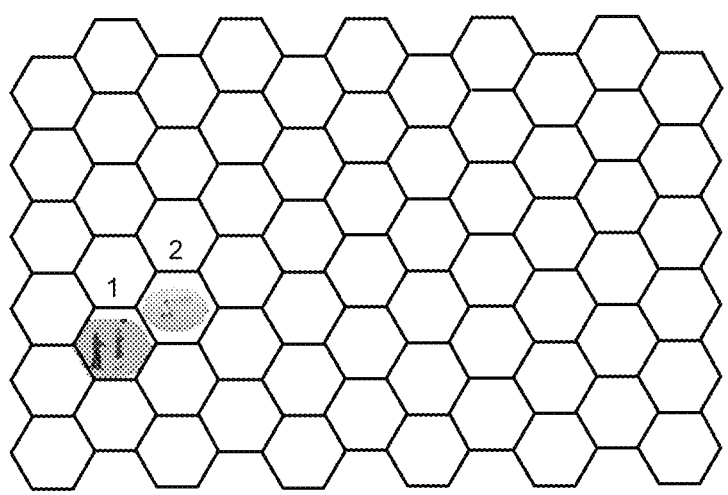
Figure 16:
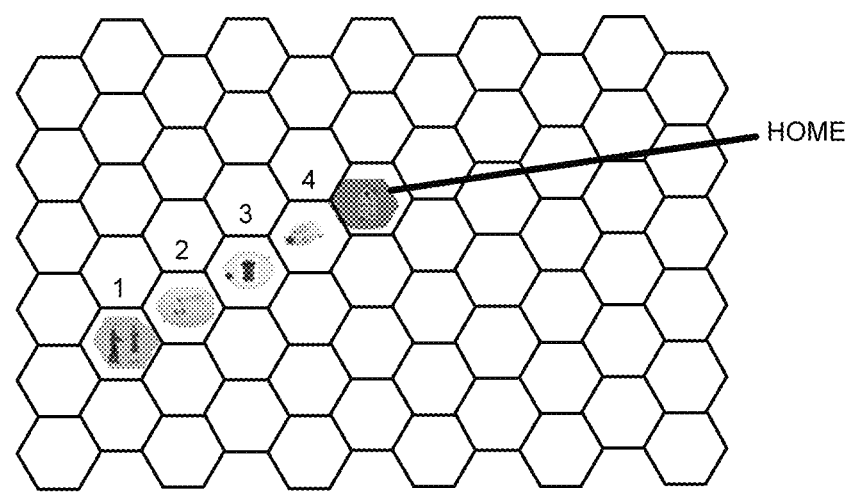

The use of hex binning to visualize data is illustrated in FIG. 15, which presents a drawing illustrating a relational grid. In FIG. 15, a superimposed spatial grid provides a regular metaphor for connecting memories. For example, a single key memory may be isolated to a given cell in the relational grid. Moreover, a proximal memory may be included a connecting or neighboring cell. The resulting memory path(s) may provide reverse-order recall toward home. This is illustrated in FIG. 16, which presents a drawing illustrating a process for connecting memories using a relational grid.

Note that the computer system may have the individual add facts to the memory model (such as a year for a given memory), so that a particular location in the memory model can encompass events over many years.

In some embodiments, a sparse amount of data is used as a proxy to infer more dense amounts of knowledge or memories about or of an individual. For example, if the individual is known to be a football fan, the computer system can infer that they know the basic rules of game without them explicitly telling the computer system.

In some embodiments, the computer system interviews an individual about a topic in which they have interest or expertise. During the interview, questions that expose a level of knowledge or understanding about this topic may be provided. Then, the computer system may compare the answers and responses with content from an authoritative source in order to learn about the topic. The computer system may present information obtained from the authoritative source as if it is the knowledge of the individual (with the correct level of detail and understanding to match the individual's understanding). In this way, the MindQuest process may seem familiar and reinforcing to the individual.

In some embodiments, the computer system may attach or associate non-verbal cues to process natural language inputs to an AI training system. Notably, the computer system may use simultaneous visual observation of the creator and the interviewer training sessions for processing and subsequent incorporation into the dynamic virtual representation. The video recording of the individual's face, expressions, changes, body posture and body language may be used for critical analysis and quality control, because the real-time feedback loop between the interviewer and the creator may be needed for training. However, the recorded video may be used as evocative material to generate emotional responses for clear categorization. For example, a creator may be asked to tell an embarrassing story. Later, the interviewer may tell the creator to watch a story that is considered childish or disgusting. Excerpts from the recording may be presented with the expectation that negative, hostile emotions will occur.

In some embodiments, the computer system attempts to reproduce atypical variations in personality, opinion, or character in a training dataset. An underlying assumption in the interface technique is that an individual can be of two minds or ambiguous under different circumstances or context. The group of behavioral agents for the dynamic virtual representation can generate these kind of personality attributes by incorporating memory models as well as a cognitive-behavioral explanation for how emotional states are co-determinant and triggered by each other. Therefore, a technique for tracking and categorizing emotions and their changes may be incorporated in the learning model for a behavioral agent. For example, a gameplay approach may include: using learned or predictive models (such as group of behavioral agents) to elicit an emotion in the individual; checking the response based at least in part on the group of behavioral agents for primary cause emotion; and/or testing for an expected secondary emotion as a way to reinforce the assumptions about the primary emotion.

In some embodiments, the computer system incorporates a variety of additional approaches in training a dynamic virtual representation. For example, a memory model and predictive models of personality may be combined in a challenge-based gameplay approach to derive a training dataset. Alternatively or additionally, a common motive-score may be used to map individual or user responses to various personal and/or social stressors for training purposes. Moreover, the computer system may add human-like features to the dynamic virtual representation by adding 'motives' to the training dataset. Furthermore, the computer system may cluster behavioral agents trained on parallel sets to organize ad-hoc adversarial roles. Additionally, the computer system may use generating corrective feedback loops and/or constructive feedback loops in training datasets. In some embodiments, adversarial and/or so-called devil's advocate functions are used in feedback loops for correcting the behaviors of one or more behavioral agents.

The computer system may be used to host and deploy a personal MindTwin or a personal dynamic virtual representation to provide functional and automatic mimicking of one or more attributes of an individual. Notably, with the creation of a dynamic virtual representation of a human, the effective use of the group of behavioral agents may require that they be deployed and operated in a realm where these behavioral agents can act and access effects on behalf of their interests of the individual, as well as in order to communicate with other behavioral agents and humans as needed, for the sake of correction, notice, and/or collaboration. Therefore, the computer system may provide a hosted environment for the behavioral agents and a vehicle or for as-needed coordination and mutual monitoring.

Multi-Dimensional Puppet

In some embodiments, the computer system uses a group of behavioral models to provide a dynamic virtual representation that includes a multi-dimensional puppet (which is sometimes referred to as a '2.5D puppet' or a '3D puppet' that includes stereopsis and/or prehension). For example, the computer system may provide a complicated, photorealistic puppet (including complicated head and body movement) that is capable of being manipulated in real time in an environment, e.g., in a web browser, on a display or a virtual reality environment. The computer system may analyze core region characterizations/phonemes/sets and deformations, and the core region sprites (or 2D or 3D bitmaps) may be used to manipulate the puppet. Note that the puppet may have the ability to be manipulated to say phrases from a given dataset.

Figure 17:
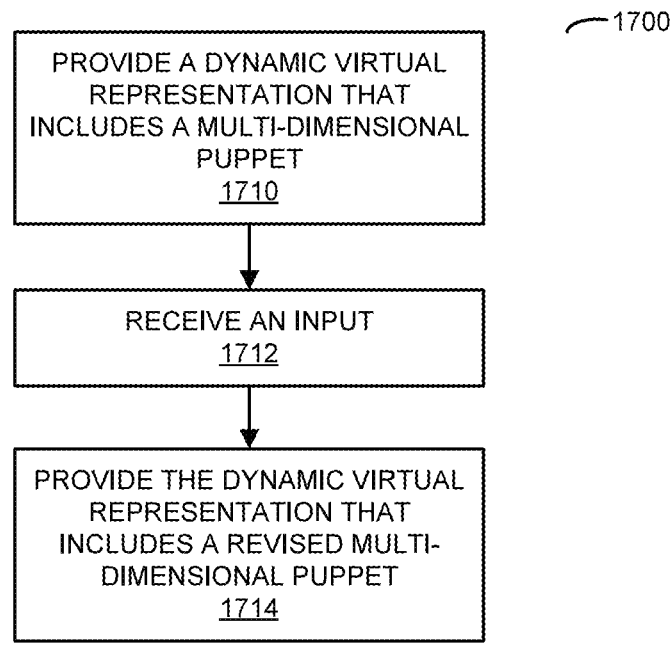
FIG. 17 is a flow diagram illustrating a method for providing a dynamic multi-dimensional puppet in accordance with an embodiment of the present disclosure.

FIG. 17 presents a flow diagram illustrating a method 1700 for providing a dynamic multi-dimensional puppet, which may be performed by a computer system (such as computer system 118 in FIG. 1). Notably, the computer system may include a computation device that performs method 1700. For example, the computation device may include one or more of: a processor, one or more cores in a second processor, or another type of device that performs computation (such as a GPU).

During operation, the computer system may provide, based at least in part on predetermined parameters, configuration information, and a group of behavioral agents, a dynamic virtual representation that includes a multi-dimensional puppet (operation 1710) having one or more attributes of an individual, where the dynamic virtual representation is configured to automatically mimic one or more attributes of the individual in a context. Moreover, the providing of the dynamic virtual representation that includes the multi-dimensional puppet involves rendering of the multi-dimensional puppet, and the multi-dimensional puppet includes stereopsis information (and, more generally, 2.5D or 3D information), and has photorealistic movement corresponding to movement behaviors of the individual.

For example, the photorealistic movement may be indistinguishable, to a human, from the movement behaviors or mannerisms of the individual. Moreover, the movement behaviors may include: a mannerism, a facial expression, a style or manner of speaking, expression of an emotion, non-verbal communication, a tone, a gesture, body language, a walking style or gait, folded arms or a posture, an eyebrow position or motion, a sudden motion (such as physically recoiling or moving away), a rate or frequency of blinking, a twitch, a gaze direction and/or emotional prosody. In some embodiments, the multi-dimensional puppet may include photorealistic facial and mouth movement while saying phrases or speaking.

Note that the group of behavioral agents may be configured in a multi-layer hierarchy based at least in part on the configuration information. Moreover, a given behavioral agent may receive one or more inputs and may provide an output corresponding to one or more features associated with an individual, and the inputs to at least some of the behavioral agents may include outputs from one or more of the other behavioral agents.

Then, the computer system may receive an input (operation 1712) corresponding to user spatial manipulation of or interaction with the multi-dimensional puppet. For example, the input may correspond to: haptic interaction of a user with a human-interface device or a touch-sensitive display, a gaze direction of the user, a verbal command from the user, and/or a gesture made by the user. Note that the input may be received from an electronic device, which is being used by the user.

Next, the computer system may provide, based at least in part on the predetermined parameters, the configuration information, the group of behavioral agents, and the input, the dynamic virtual representation that includes a revised multi-dimensional puppet (operation 1714) having the one or more attributes.

In some embodiments, the computer system optionally performs one or more additional operations. For example, the providing of the dynamic virtual representation that includes the revised multi-dimensional puppet may involve rendering of the revised multi-dimensional puppet, and the revised multi-dimensional puppet may include prehension corresponding to movement of the revised multi-dimensional puppet (relative to the multi-dimensional puppet) that is specified by the input.

Moreover, the dynamic virtual representation and/or the revised dynamic virtual representation may be displayed on the electronic device or on a display associated with the electronic device.

Furthermore, the rendering may be based at least in part on one or more of: characterization of movement a neck, a mouth and eyes of the individual, phonemes associated with speech of the individual, and/or deformations of a face of the individual while performing the movement behaviors.

Additionally, the multi-dimensional puppet may include 2D data transposed onto a 3D mesh.

In some embodiments, the multi-dimensional puppet may include: a 3D rig having a shape corresponding to at least a shape of a head and neck of the individual; a neutral layer corresponding to a look and color of at least the face and the neck of the individual; a core region overlay layer with 2D bitmaps for portions of the face and the neck of the individual; and/or a specular overlay layer that reproduces specular highlights of the individual. Note that the portions of the face and the neck may include: a mouth, eyes, a submandibular triangle, a submental triangle, and/or a muscular triangle.

Moreover, the multi-dimensional puppet may include looped persistent movements corresponding to the movement behaviors.

In some embodiments, the multi-dimensional puppet may include a hologram. Moreover, in some embodiments the multi-dimensional puppet may be used in conjunction with a robot. Furthermore, in some embodiments the multi-dimensional puppet may be revised in real-time (i.e., one a shorter timescale than a human can notice) as the spatial manipulation is received.

In some embodiments of method 200 (FIG. 2), method 600 (FIG. 6) and/or method 1700, there may be additional or fewer operations. Moreover, the order of the operations may be changed, and/or two or more operations may be combined into a single operation.

Figure 18:
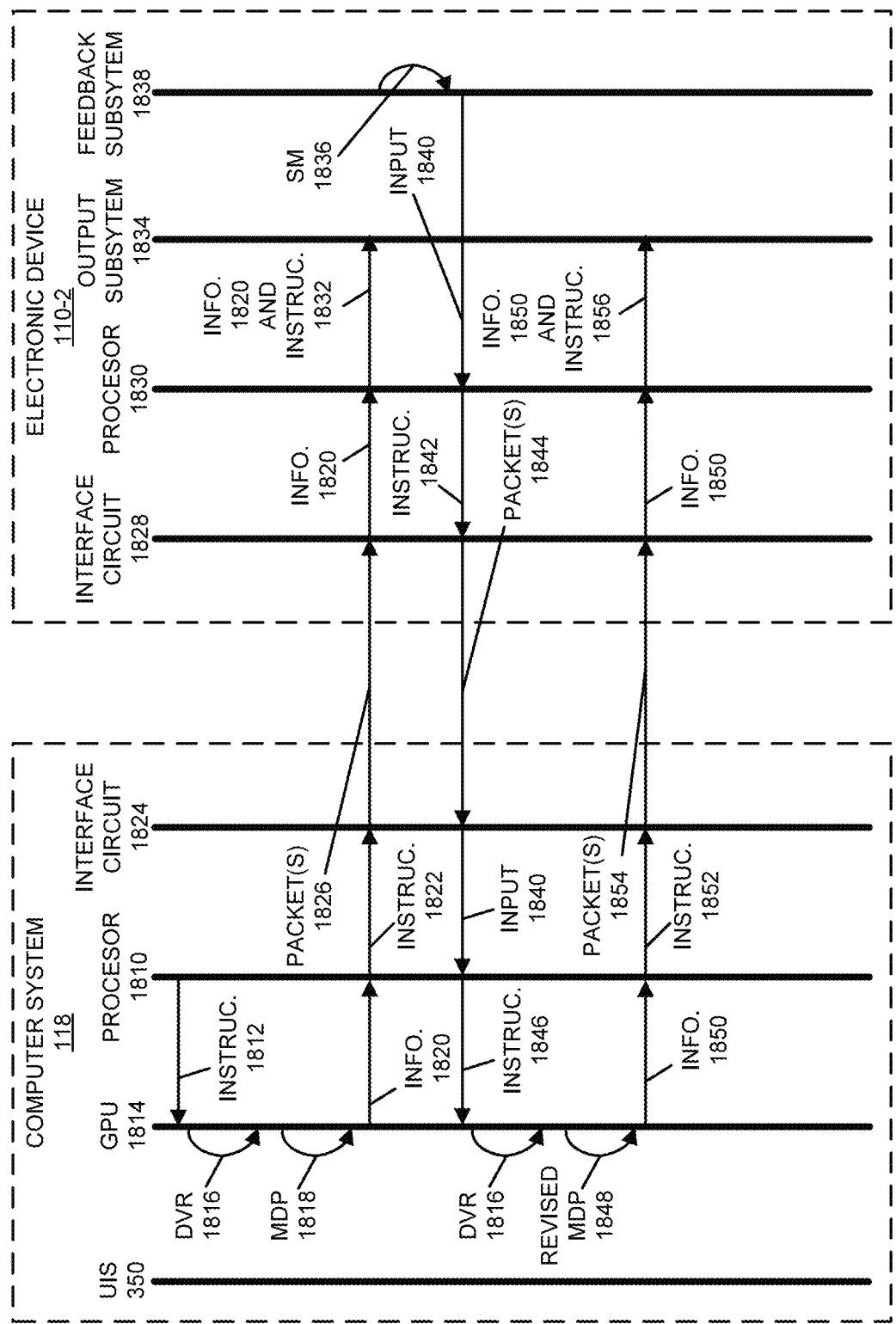
FIG. 18 is a drawing illustrating communication among components in the computer system in FIG. 1 in accordance with an embodiment of the present disclosure.

Embodiments of the interaction technique are further illustrated in FIG. 18, which presents a drawing illustrating communication among components in system 100 (FIG. 1). Notably, during the interaction technique, processor 1810 executing program instructions in computer system 118 may instruct 1812 GPU 1814 to generate a dynamic virtual representation (DVR) 1816 that includes a multi-dimensional puppet (MDP) 1818 having one or more attributes of the individual based at least in part on predetermined parameters, configuration information and the group of behavioral agents, where the dynamic virtual representation 1816 automatically mimics the one or more attributes of the individual. Note that generating the dynamic virtual representation 1816 that includes the multi-dimensional puppet 1818 may involve rendering of the multi-dimensional puppet 1818 (such as by a machine-learning model and/or a deep-learning model), and the multi-dimensional puppet 1818 may include stereopsis information and may have photorealistic movement corresponding to movement behaviors of the individual.

Moreover, GPU 1814 may provide information 1820 corresponding to the dynamic virtual representation 1816 to processor 1810. Processor 1810 may instruct 1822 interface circuit 1824 to provide one or more packets 1826 or frames with the information 1820 to electronic device 110-2.

After receiving the one or more packets 1826, interface circuit 1828 in electronic device 110-2 may provide the information 1820 to processor 1830 in electronic device 110-2. Processor 1830 may instruct 1832 output subsystem 1834 to present the dynamic virtual representation 1816 and the multi-dimensional puppet 1818 to a user of electronic device 110-2.

In response, the user may interact with the multi-dimensional puppet 1818, such as providing spatial manipulation (SM) 1836 of the multi-dimensional puppet 1818 to feedback subsystem 1838, which provides a corresponding input 1840 (such as an input stimuli) to processor 1830. Then, processor 1830 may instruct 1842 interface circuit 1828 to provide the input 1840 to computer system 118 in one or more packets 1844 or frames.

After receiving the one or more packets 1842 or frames, interface circuit 1824 may provide input 1840 to processor 1810. In response, processor 1810 may instruct 1846 GPU 1814 to generate the dynamic virtual representation 1816 that includes a revised multi-dimensional puppet 1848 having the one or more attributes of the individual based at least in part on the predetermined parameters, the configuration information, the group of behavioral agents and the input 1840. Note that generating the dynamic virtual representation 1816 may involve rendering of the revised multi-dimensional puppet 1848, and the revised multi-dimensional puppet 1848 may include stereopsis information and prehension corresponding to movement of the revised multi-dimensional puppet 1848 that is specified by the input 1840.

Moreover, GPU 1814 may provide information 1850 corresponding to the dynamic virtual representation 1816 to processor 1810. Processor 1810 may instruct 1852 interface circuit 1824 to provide one or more packets 1854 or frames with the information 1850 to electronic device 110-2.

After receiving the one or more packets 1854, interface circuit 1828 may provide the information 1850 to processor 1830. Then, processor 1830 may instruct 1856 output subsystem 1834 to present the dynamic virtual representation 1816 and the revised multi-dimensional puppet 1848 to the user of electronic device 110-2.

In some embodiments, the computer system generates a dynamic virtual representation that includes a multi-dimensional puppet using different layers, such as: puppet layers, a neutral layer, a core region overlay layer, a specular overlay layer, a puppet body rig and/or a puppet face rig. In general, fewer manipulations of the 2D source material may produce better results with limited retargeting playback. Consequently, the puppet layers may use a hybrid to transpose 2D data onto a rough 3D mesh in order to be more easily manipulated and to produce subtle parallax.

The neutral layer may be the most-basic layer that represents the general look of the source actor or individual. This neutral layer may be reconstructed from source video and may be used as a base texture to color the face mesh. Initially, the neutral layer may be designed as a static image. However, in some embodiments, the base layer may be made into a looping sprite to add life to the puppet.

Moreover, the core region overlay layer may include several core regions of the face and neck that can be replaced (or overlaid) with a non-neutral expression, shape or movement. For example, the neutral layer may portray the actor with their eyes open. However, when the puppet is told to blink, a small sprite sheet may be overlaid over each eye and played back, which may contain frames of the source video actor blinking.

Furthermore, the specular overlay layer may act as a reproduction of specular highlights on the source actor or individual. The purpose of the specular overlay layer may be to add believability to the puppet, while retaining the ability to manipulate it.

Additionally, the puppet body rig may include, e.g., a 24-bone bipedal setup. In some embodiments, the hips and legs may be disregarded. A bipedal rig may serve several purposes. Notably, it may provide an animatable midsection/shoulders/arms that can be matched to source footage, so that it retains unique characterizations of the source actor or individual. Note that motion capture software may be used to evaluate camera-source footage motion and can be retargeted to the puppet body rig. Moreover, a loop may be created to inject persistent movement into a puppet that was derived from the source video and may be distilled into unique characterizations that are paired with phrases. In general, having the ability to independently control the motion of each separate bone in the puppet body rig may allow greater control over the puppet, because motions can be seamlessly blended together.

The puppet face rig may be a semi-3D representation of a generic head that can be warped to match a source actor or individual. Once the puppet face rig is matched to a source actor or individual, it may be attached to the head bone of the puppet body rig and can be manipulated spatially.

Note that certain components of the puppet face rig and/or the core region overlaps may be positioned on top of a base mesh and may be capable of playing short clips of extracted video that have been condensed into easily consumed sprite sheets. The edges of each core region overlay may be feathered to blend into the neutral layer.

In some embodiments, the base mesh is manipulated based at least in part on a particular characterization. While this type of manipulation may involve risk, the resulting base mesh vertices may only be warped where the core region overlay supports such manipulation.

The computer system may also capture and retarget phonemes. For example, the computer system may compile a set of phonemes (such as a set of 39 phonemes) from the video of each source actor individual. While useful, the phoneme may not allow a seamless transition from stasis into a particular phoneme, or from a particular phoneme into another phoneme.

In order to support transitions from stasis (or inactivity) to outputting a phoneme and transitioning back to stasis, each phoneme may be a short extracted video that is converted into sprites, stabilized and mapped onto a core region overlay. Then, the computer system may be able to transition into and out of a particular shape by retiming the source sprite.

Note that a core region overlay may denote a special area of the puppet where optional core region sprites can be applied to transition into and out of region specific characterizations. An example of a core region overlay is the eyes of the puppet. A less obvious example of a core region overlay is the throat of the puppet. Moreover, a core region sprite may be a loopable, transparent sprite sheet that contains a region specific characterization. Furthermore, a core region characterization may be a particular motion or deviation from stasis performed by the source actor or the individual. For example, a core region characterization may be a mouth shape or an eye blink. A core region characterization may include video as well as a neutral layer distortion definition. Additionally, a core region characterization set may be used to combine several characterizations in a weighted application. For example, a puppet may need to raise its eyebrows, open its mouth and/or have clench temples. A core region characterization set may be generated to execute these changes on the puppet facial rig.

We now describe embodiments of an electronic device. FIG. 19 presents a block diagram illustrating an electronic device 1900, such as one of electronic devices 110, the optional base station 112, the optional access point 116 and/or computer system 118 in FIG. 1. This electronic device includes processing subsystem 1910, memory subsystem 1912, and networking subsystem 1914. Processing subsystem 1910 includes one or more devices configured to perform computational operations. For example, processing subsystem 1910 can include one or more microprocessors, application-specific integrated circuits (ASICs), microcontrollers, programmable-logic devices, GPUs and/or one or more digital signal processors (DSPs).

Memory subsystem 1912 includes one or more devices for storing data and/or instructions for processing subsystem 1910 and networking subsystem 1914. For example, memory subsystem 1912 can include dynamic random access memory (DRAM), static random access memory (SRAM), and/or other types of memory. In some embodiments, instructions for processing subsystem 1910 in memory subsystem 1912 include: one or more program modules or sets of instructions (such as program instructions 1922 or operating system 1924), which may be executed by processing subsystem 1910. Note that the one or more computer programs may constitute a computer-program mechanism. Moreover, instructions in the various modules in memory subsystem 1912 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1910.

In addition, memory subsystem 1912 can include mechanisms for controlling access to the memory. In some embodiments, memory subsystem 1912 includes a memory hierarchy that comprises one or more caches coupled to a memory in electronic device 1900. In some of these embodiments, one or more of the caches is located in processing subsystem 1910.

In some embodiments, memory subsystem 1912 is coupled to one or more high-capacity mass-storage devices (not shown). For example, memory subsystem 1912 can be coupled to a magnetic or optical drive, a solid-state drive, or another type of mass-storage device. In these embodiments, memory subsystem 1912 can be used by electronic device 1900 as fast-access storage for often-used data, while the mass-storage device is used to store less frequently used data.

Figure 19:
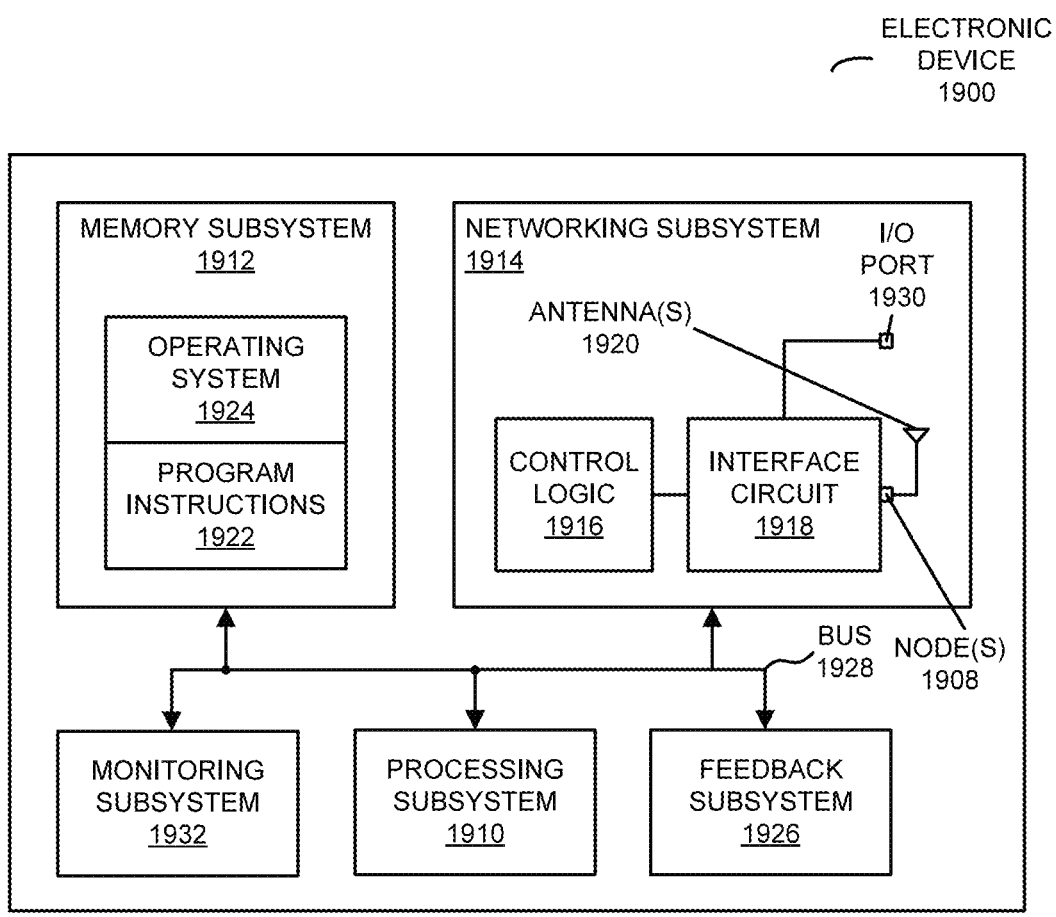
FIG. 19 is a block diagram illustrating an electronic device in accordance with an embodiment of the present disclosure.
Figure 20:
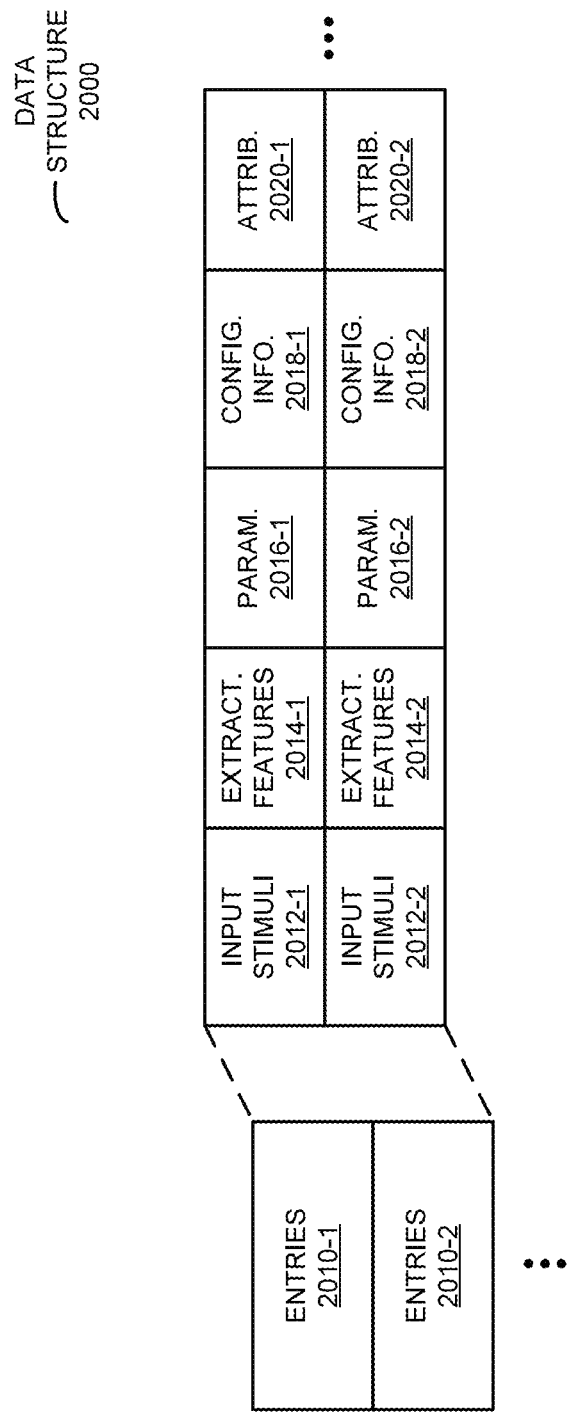
FIG. 20 is a block diagram illustrating a data structure for use in conjunction with the electronic device of FIG. 19 in accordance with an embodiment of the present disclosure.

FIG. 20 presents a block diagram illustrating a data structure 2000 for use in conjunction with electronic device 1900 (FIG. 19). This data structure may include multiple entries 2008 with: input stimuli 2012, extracted features 2014, parameters 2016 for behavioral agents (including inputs, dependencies and outputs), configuration information 2018 for a multi-layer hierarchy, and/or one or more attributes 2020.

In other embodiments, the order of items in data structure 2000 can vary and additional and/or different items can be included. Moreover, other sizes or numerical formats and/or data can be used.

Referring back to FIG. 19, networking subsystem 1914 includes one or more devices configured to couple to and communicate on a wired and/or wireless network (i.e., to perform network operations), including: control logic 1916, an interface circuit 1918, one or more antennas 1920 and/or input/output (I/O) port 1930. (While FIG. 19 includes one or more antennas 1920, in some embodiments electronic device 1900 includes one or more nodes 1908, e.g., a pad, which can be coupled to one or more antennas 1920. Thus, electronic device 1900 may or may not include one or more antennas 1920.) For example, networking subsystem 1914 can include a Bluetooth networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 1914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 1900 may use the mechanisms in networking subsystem 1914 for performing simple wireless communication between the electronic devices, e.g., transmitting advertising or beacon frames and/or scanning for advertising frames transmitted by other electronic devices as described previously.

Within electronic device 1900, processing subsystem 1910, memory subsystem 1912, and networking subsystem 1914 are coupled together using bus 1928. Bus 1928 may include an electrical, optical, and/or electro-optical connection that the subsystems can use to communicate commands and data among one another. Although only one bus 1928 is shown for clarity, different embodiments can include a different number or configuration of electrical, optical, and/or electro-optical connections among the subsystems.

In some embodiments, electronic device 1900 includes a feedback subsystem 1926 that provides or presents information (such as a dynamic virtual representation) to a user of electronic device 1900. For example, feedback subsystem 1926 may include a display subsystem that displays the information on a display, which may include a display driver and the display, such as a liquid-crystal display, a multi-touch touchscreen, etc. Moreover, electronic device 1900 may include a monitoring subsystem 1932 with one or more sensors for monitoring or measuring in an environment or of an individual or a user of electronic device 1900. For example, monitoring subsystem 1932 may include one or more image sensor that acquire or capture one or more images.

Electronic device 1900 can be (or can be included in) any electronic device with at least one network interface. For example, electronic device 1900 can be (or can be included in): a desktop computer, a laptop computer, a subnotebook/netbook, a server, a mainframe computer, a cloud-based computer system, a tablet computer, a smartphone, a cellular telephone, a smart watch, a headset, electronic or digital glasses, headphones, a consumer-electronic device, a portable computing device, an access point, a router, a switch, communication equipment, test equipment, a wearable appliance, and/or another electronic device.

Although specific components are used to describe electronic device 1900, in alternative embodiments, different components and/or subsystems may be present in electronic device 1900. For example, electronic device 1900 may include one or more additional processing subsystems, memory subsystems, networking subsystems, feedback subsystems (such as an audio subsystem) and/or monitoring subsystems. Additionally, one or more of the subsystems may not be present in electronic device 1900. Moreover, in some embodiments, electronic device 1900 may include one or more additional subsystems that are not shown in FIG. 19. Also, although separate subsystems are shown in FIG. 19, in some embodiments, some or all of a given subsystem or component can be integrated into one or more of the other subsystems or component(s) in electronic device 1900. For example, in some embodiments program instructions 1922 are included in operating system 1924.

Moreover, the circuits and components in electronic device 1900 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 1914, such as a radio. Moreover, the integrated circuit may include hardware and/or software mechanisms that are used for transmitting wireless signals from electronic device 1900 and receiving signals at electronic device 1900 from other electronic devices. Aside from the mechanisms herein described, radios are generally known in the art and hence are not described in detail. In general, networking subsystem 1914 and/or the integrated circuit can include any number of radios. Note that the radios in multiple-radio embodiments function in a similar way to the described single-radio embodiments.

In some embodiments, networking subsystem 1914 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, receiving the input data, etc.)

While communication protocols compatible with Ethernet, Wi-Fi and a cellular-telephone communication protocol were used as illustrative examples, the described embodiments of the interaction technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the interaction technique may be implemented using program instructions 1922, operating system 1924 (such as a driver for interface circuit 1918) and/or in firmware in interface circuit 1918. Alternatively or additionally, at least some of the operations in the interaction technique may be implemented in a physical layer, such as hardware in interface circuit 1918.

In the preceding description, we refer to 'some embodiments.' Note that 'some embodiments' describes a subset of all of the possible embodiments, but does not always specify the same subset of embodiments. Moreover, note that the numerical values provided are intended as illustrations of the interaction technique. In other embodiments, the numerical values can be modified or changed.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
a computation device;
memory configured to store program instructions, wherein, when executed by the computation device, the program instructions cause the computer system to perform one or more operations comprising:
receiving information associated with an interaction with an individual in a context;
analyzing the information to extract features associated with one or more attributes of the individual;
generating, based at least in part on the extracted features and using a group of behavioral agents in a multi-layer hierarchy, a dynamic virtual representation that automatically mimics the one or more attributes of the individual, wherein a given behavioral agent receives one or more inputs and provides an output corresponding to one or more of the extracted features, and wherein the inputs to at least some of the behavioral agents include outputs from one or more of the other behavioral agents;
calculating one or more performance metrics associated with the dynamic virtual representation and the one or more attributes;
determining, based at least in part on the one or more performance metrics, one or more deficiencies in the extracted features; and
selectively acquiring second information associated with additional interaction with the individual in the context based at least in part on the one or more deficiencies, wherein the second information at least in part corrects for the one or more deficiencies, and wherein acquiring the second information involves provoking specific responses from the individual based at least in part on the one or more deficiencies.

2. The computer system of claim 1, wherein the one or more operations comprise:
analyzing the second information to extract second features associated with one or more attributes of the individual;
generating, based at least in part on the second extracted features, a revised dynamic virtual representation that automatically mimics the one or more attributes of the individual;
calculating one or more second performance metrics associated with the revised dynamic virtual representation and the one or more attributes; and
determining, based at least in part on the one or more second performance metrics, one or more second deficiencies in the second extracted features.

3. The computer system of claim 1, wherein the context comprises interacting with the individual.

4. The computer system of claim 1, wherein the information comprises one or more of: one or more images, sound, writing, an anatomic response of the individual, a selection from a human interface, neuronal signals, or a second type of measurement.

5. The computer system of claim 1, wherein the one or more attributes comprise one or more of: a behavior, an emotion, a type of humor, a mannerism, a style of speech, a memory or a thought process.

6. The computer system of claim 1, wherein a given behavioral agent comprises an artificial neural network.

7. The computer system of claim 1, wherein the information is associated with an electronic device.

8. The computer system of claim 1, wherein the features comprise one or more of: spoken or written communication of the individual, an emotion of the individual, non-verbal communication by the individual, a tone, a style or manner of speaking, a gesture, facial expression, a vital sign, body language, folded arms or a posture, an eyebrow position or motion, a sudden motion, a rate or frequency of blinking, a twitch, a gaze direction and/or emotional prosody.

9. The computer system of claim 1, wherein at least some of the operations of the computer system are performed by a discriminator in a generative adversarial network.

10. A non-transitory computer-readable storage medium for use in conjunction with a computer system, the computer-readable storage medium configured to store program instructions that, when executed by the computer system, causes the computer system to perform one or more operations comprising:
receiving information associated with an interaction with an individual in a context;
analyzing the information to extract features associated with one or more attributes of the individual;
generating, based at least in part on the extracted features and using a group of behavioral agents in a multi-layer hierarchy, a group of behavioral agents in a multi-layer hierarchy that automatically mimics the one or more attributes of the individual, wherein a given behavioral agent receives one or more inputs and provides an output corresponding to one or more of the extracted features, and wherein the inputs to at least some of the behavioral agents include outputs from one or more of the other behavioral agents;
calculating one or more performance metrics associated with a dynamic virtual representation and the one or more attributes;
determining, based at least in part on the one or more performance metrics, one or more deficiencies in the extracted features; and
selectively acquiring second information associated with additional interaction with the individual in the context based at least in part on the one or more deficiencies, wherein the second information at least in part corrects for the one or more deficiencies, and wherein acquiring the second information involves provoking specific responses from the individual based at least in part on the one or more deficiencies.

11. The computer-readable storage medium of claim 10, wherein the one or more operations comprise:
analyzing the second information to extract second features associated with one or more attributes of the individual;
generating, based at least in part on the second extracted features, a revised dynamic virtual representation that automatically mimics the one or more attributes of the individual;
calculating one or more second performance metrics associated with the revised dynamic virtual representation and the one or more attributes; and
determining, based at least in part on the one or more second performance metrics, one or more second deficiencies in the second extracted features.

12. The computer-readable storage medium of claim 10, wherein the context comprises interacting with the individual.

13. The computer-readable storage medium of claim 10, wherein the information comprises one or more of: one or more images, sound, writing, an anatomic response of the individual, a selection from a human interface, neuronal signals, or a second type of measurement.

14. The computer-readable storage medium of claim 10, wherein the one or more attributes comprise one or more of: a behavior, an emotion, a type of humor, a mannerism, a style of speech, a memory or a thought process.

15. The computer-readable storage medium of claim 10, wherein a given behavioral agent comprises an artificial neural network.

16. The computer-readable storage medium of claim 10, wherein the information is associated with an electronic device.

17. The computer-readable storage medium of claim 10, wherein the features comprise one or more of: spoken or written communication of the individual, an emotion of the individual, non-verbal communication by the individual, a tone, a style or manner of speaking, a gesture, facial expression, a vital sign, body language, folded arms or a posture, an eyebrow position or motion, a sudden motion, a rate or frequency of blinking, a twitch, a gaze direction and/or emotional prosody.

18. The computer-readable storage medium of claim 10, wherein at least some of the operations of the computer system are performed by a discriminator in a generative adversarial network.

19. A method for dynamically and intuitively aggregating a training dataset, wherein the method comprises:
by a computer system:
receiving information associated with an interaction with an individual in a context;
analyzing the information to extract features associated with one or more attributes of the individual;
generating, based at least in part on the extracted features and using a group of behavioral agents in a multi-layer hierarchy, a group of behavioral agents in a multi-layer hierarchy that automatically mimics the one or more attributes of the individual, wherein a given behavioral agent receives one or more inputs and provides an output corresponding to one or more of the extracted features, and wherein the inputs to at least some of the behavioral agents include outputs from one or more of the other behavioral agents;
calculating one or more performance metrics associated with a dynamic virtual representation and the one or more attributes;
determining, based at least in part on the one or more performance metrics, one or more deficiencies in the extracted features; and
selectively acquiring second information associated with additional interaction with the individual in the context based at least in part on the one or more deficiencies, wherein the second information at least in part corrects for the one or more deficiencies, and wherein acquiring the second information involves provoking specific responses from the individual based at least in part on the one or more deficiencies.

20. The method of claim 19, wherein at least some of the operations of the computer system are performed by a discriminator in a generative adversarial network.

\* \* \* \* \*